(12) United States Patent
Liu

(10) Patent No.: US 9,893,677 B1
(45) Date of Patent: Feb. 13, 2018

(54) BOTTOM CLAMP FOR MOUNTING SOLAR PANELS TO ROOFS

(71) Applicant: Sunmodo Corporation, Vancouver, WA (US)

(72) Inventor: Jun Liu, Camas, WA (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 15/643,351

(22) Filed: Jul. 6, 2017

(51) Int. Cl.
| | |
|---|---|
| *E04D 13/18* | (2014.01) |
| *H02S 20/23* | (2014.01) |
| *H02S 30/00* | (2014.01) |
| *H02S 20/22* | (2014.01) |
| *H02S 20/26* | (2014.01) |
| *H02S 20/24* | (2014.01) |

(Continued)

(52) U.S. Cl.
CPC .............. *H02S 20/23* (2014.12); *H02S 30/00* (2013.01); *E04D 3/36* (2013.01); *F16B 2/065* (2013.01); *F24J 2/5249* (2013.01); *H02S 20/22* (2014.12); *H02S 20/24* (2014.12); *H02S 20/26* (2014.12)

(58) Field of Classification Search
CPC . E04D 3/36; E04D 13/00; F16B 2/065; F16B 2/02; Y02E 10/47; Y02E 10/50; F24J 2/5249; F24J 2/4658; F24J 2/5258; F24J 2/5243; F24J 2/5245; F24J 2/5252; F24J 2/5256; F24J 2/5254; Y10T 403/7076; Y10T 403/7062; H02S 20/00; H02S 20/22; H02S 20/23; H02S 20/24; H02S 20/26
USPC ........ 52/173.3, 173.1; 248/316.1, 200, 316.7
See application file for complete search history.

(56) References Cited

U.S. PATENT DOCUMENTS

| | | | |
|---|---|---|---|
| 1,343,930 | A | 6/1920 | Neely |
| 1,473,504 | A | 12/1922 | Neely |

(Continued)

FOREIGN PATENT DOCUMENTS

| | | |
|---|---|---|
| CN | 102966220 B | 3/2013 |
| CN | 202925779 U | 5/2013 |

(Continued)

OTHER PUBLICATIONS

Unirac RM Design and Engineering PUB131010, pp. P47, P53, and P54, Oct. 2013, Unirac, Inc., Albuquerque, New Mexico, US.

(Continued)

*Primary Examiner* — Chi Q Nguyen
(74) *Attorney, Agent, or Firm* — Stone Creek Services LLC; Alan M Flum

(57) ABSTRACT

A solar panel bottom clamp assembly that secures the underside of a solar panel frame (i.e. the return flange of the solar panel) to a solar panel mounting device that is securable to a roof. The solar panel bottom clamp is adjustable, allowing the solar panel to be positioned and then secured to the solar panel bottom clamp. The solar panel bottom clamp assembly includes a base, a clamping member, a threaded fastener, and optionally, a spring. The base includes a platform for seating the solar panel. The clamping member includes a clamping member body and a hooked portion positioned above the clamping member body with an indentation for engaging the return flange. The threaded fastener non-threadably engages opposing sides of the base and threadably engages the clamping member causing the clamping member to move between the opposing sides below the platform.

15 Claims, 24 Drawing Sheets

(51) Int. Cl.
*F24J 2/52* (2006.01)
*E04D 3/36* (2006.01)
*F16B 2/06* (2006.01)

(56) References Cited

U.S. PATENT DOCUMENTS

| | | | |
|---|---|---|---|
| 1,523,597 | A | 1/1925 | Lang |
| 5,176,462 | A * | 1/1993 | Chen ................ A47F 5/105 |
| | | | 160/135 |
| 6,032,939 | A | 3/2000 | Chen |
| 7,703,256 | B2 * | 4/2010 | Haddock ................ F16B 2/10 |
| | | | 52/24 |
| 8,407,895 | B2 | 4/2013 | Hartelius et al. |
| 8,480,330 | B2 | 7/2013 | Urban et al. |
| 8,935,893 | B2 * | 1/2015 | Liu ................ F24J 2/5258 |
| | | | 126/623 |
| 9,011,034 | B2 | 4/2015 | Liu et al. |
| 9,080,792 | B2 | 7/2015 | Patton et al. |
| 9,316,416 | B2 | 4/2016 | Poulakis |
| 9,551,510 | B2 | 1/2017 | Hartelius et al. |
| 2009/0230265 | A1 | 9/2009 | Newman et al. |
| 2012/0138764 | A1 * | 6/2012 | Kemple ................ F24J 2/465 |
| | | | 248/316.1 |
| 2012/0167364 | A1 | 7/2012 | Koch et al. |
| 2013/0125492 | A1 | 5/2013 | Molek et al. |
| 2014/0353435 | A1 * | 12/2014 | Liu ................ F24J 2/5258 |
| | | | 248/74.1 |
| 2015/0244308 | A1 | 8/2015 | Patton et al. |
| 2016/0054030 | A1 | 2/2016 | Ilzhofer |
| 2016/0111996 | A1 * | 4/2016 | Stephan ................ F16B 5/0028 |
| | | | 248/316.6 |
| 2016/0268965 | A1 | 9/2016 | Stearns et al. |
| 2016/0282018 | A1 | 9/2016 | Ash et al. |

FOREIGN PATENT DOCUMENTS

| | | |
|---|---|---|
| CN | 103280473 A | 9/2013 |
| CN | 203942481 U | 6/2014 |
| DE | 20117398 U1 | 6/2014 |
| DE | 202014004487 U1 | 10/2015 |
| EP | 1947402 A1 | 7/2008 |
| EP | 1947402 A2 | 6/2011 |

OTHER PUBLICATIONS

Sun Frame Microrail Installation Guide, Feb. 2016, EcoFastener Solar, Morrisville, Vermont, U.S.
FixPlan KlickTop Product Sheet, Publication No. I400118GB, V4, Sep. 2015, Schletter GmbH, Kirchdorf, Germany.
Standard Flush Mount Installation Manual, Publication No. MI-033 072516, Schletter, Inc., Jul. 2016, Shelby, North Carolina, US.
Solar Panel Aluminum Frame, Smartclima Co.,Ltd., Ningbo,China, downloaded from the Internet from http://www.smartclima.com/solar-panel-aluminium-frame.htm on Jun. 20, 2017.
U.S. Appl. No. 15/604,623 (co-pending and unpublished), Inventors: Roland Jasmin et al., Applicant and Assignee: Sunmodo Corporation, filed May 24, 2017, United States Patent and Trademark Office, Alexandra, Virginia, US.

* cited by examiner

BOTTOM CLAMP FOR MOUNTING SOLAR PANELS TO ROOFS

BACKGROUND

This disclosure relates to devices for mounting solar panels to roofs of building structures. Specifically, this disclosure relates to mounting solar panels to roof structures using solar panel bottom clamps.

Solar Panels can mount to various types of roof structures, such as pitched shingle roofs, tile roofs, metal roofs, or concrete roofs. Solar panels often mount together in rows and columns known as solar panel arrays. Solar panels and solar panel arrays commonly secure to rails that typically span the length of one or more solar panels. Mounting brackets typically secure the rails the roof structure. Alternatively, so called rail-less mounting devices can mount solar panels and solar panel arrays to roof structures without rails.

In either instance, the solar panels secure to the rail or the rail-less mounting devices using either over-the-panel clamps or under the panel clamps or clips. Over-the-panel clamps, called mid-clamps, mount between two solar panels. Over-the-panel clamps, known as end-clamps, mount at an outside perimeter or end of an array of solar panels. Mid-clamps and end-clamps clamp the top of the solar panel frame to a mounting structure, such as a rail or a rail-less mounting bracket, by clamping pressure between the top of the solar panel frame and the mounting structure.

Under-the-panel clamps or clips secure the underside of the solar panel frame to a mounting structure such as a rail or rail-less mounting device. Under-the-panel clamps or clips are also known as solar panel bottom clamps or bottom clips. Solar panel bottom clamps can create a cleaner appearance as compared with mid-clamps and end-clamps because most of the bottom clamp is hidden and does not cover the top of the solar panel frame. Finally, some solar panel mounting systems use a combination of over-the-panel clamps and under the panel clamps. For example, mid-clamps between solar panels in combination with bottom clamps at the perimeter edges of the solar panel array.

SUMMARY

The inventor noted that some solar panel bottom clamps have fix position clips; i.e. the solar panel engaging portion does not move relative to the mounting structure. This requires the installer to position the solar panel so that a portion of the clamp engages and hooks the inside lip of the solar panel frame (or "return flange" of the solar panel frame). Solar panels for residential use are typically 1.65 meter (65 inches)×1 meter (39 inches). This can be awkward for one installer to position with precision. The inventor also noted that while some solar panel bottom clamps, have adjustable solar panel engaging portions, these often where not convenient for the installers to adjust after solar panel installation.

The inventor set out to overcome these deficiencies and discovered he could devise a solar panel bottom clamp that includes a base, a clamping member, a threaded fastener, and optionally, a spring to aid in installation. The base includes a platform for seating the solar panel. The clamping member includes a clamping member body and a mounting clip with a hooked portion positioned above the clamping member body. The mounting clip includes an indentation for engaging the return flange of the solar panel. The threaded fastener non-threadably engages opposing sides of the base and threadably engages the clamping member causing the clamping member to move between the opposing sides below the platform.

The base can include a first platform, a second platform, a first side, a second side, and a panel rest. The first side and the second side each include unthreaded apertures. The unthreaded apertures align to form a line parallel to the upward-facing surface of the first platform. The clamping member can include a clamping member body and a mounting clip. The mounting clip includes a hooked portion and an indentation. The hooked portion projects upward from an end of the clamping member body with the hooked portion projecting convexly toward the opposite end of the clamping member body. The hooked portion can be integrally extruded, cast, or otherwise formed with the clamping member body or can be separately attached. The indentation is positioned between an inside edge of the hooked portion and the clamping member body. The indentation is wide enough to accommodate the thickness of the return flange but narrow enough to allow the hooked portion of the mounting clip to retain the return flange when the clamping member is tightened against the base. The clamping member body includes a threaded aperture. The clamping member body optionally includes projected portions. The projected portions project planarly along the top and bottom outside surfaces, respectively, of the clamping member body.

The threaded fastener includes a fastener head and a fastener body. Portions of the fastener body pass through unthreaded apertures in first side and the second side of the base and threadably engage the threaded aperture. The fastener head seats on the outward facing surface of the first side of the base. The fastener body can optionally pass through the spring with the spring positioned between the inward facing surface of the clamping member body and the inward facing surface of the first side. The spring can help hold the clamping member open away from the clamping member body to aid in installation of the solar panel. With this arrangement, the top and bottom surface of the clamping member body, and optionally the top of the projected portion and the bottom of the projected portion, are movable along the bottom surface of the second platform and the top surface of the first platform.

Tightening the threaded fastener causes the fastener body to engage the clamping member and pulls the clamping member toward the first side and away from the second side of the base. The mounting clip moves toward the solar panel frame with the indentation engaging the return flange, securing the solar assembly to the solar panel bottom clamp assembly. When used, the spring will compress as the threaded fastener is tightened.

Loosening the threaded fastener disengages the fastener body from the clamping member and pulls the clamping member away from the first side and toward the second side of the base. The mounting clip moves away from the solar panel frame with the indentation and hooked portion moving away from the return flange, allowing the solar panel disengage or be removed from the solar panel bottom clamp assembly. If the spring is optionally used, it will decompress as the threaded fastener is loosened. The spring helps to create smooth engagement and disengagement of the return flange by the mounting clip by creating spring force in the direction disengagement. This creates more tension engaging as opposed to disengaging the return flange.

The threaded fastener spins freely within the unthreaded apertures. The threaded fastener need not be threaded at the end portions that engage the unthreaded apertures. For example, the portion of the fastener body closest to the fastener head with a length approximate to the thickness of the first side of the base can be unthreaded. Likewise, the end of the fastener body that is distal to the fastener body can be unthreaded from the end into the portion engaging the second side. The threaded fastener can optionally be rotatably secured to the base by a retainer. The retainer can be, for example, a cotter pin engaging an aperture through the diameter of the fastener body, a retaining clip engaging a groove in the fastener body, or other equivalent retaining hardware.

The solar panel bottom clamp assembly has several advantages. First, the solar panel can be pre-placed against the top of the second platform and the inward facing surface of the panel rest. The clamp can then be adjusted to secure the solar panel. Second, the solar panel installer can have easy access to both secure and disengage the solar panel to the solar panel bottom clamp assembly. The fastener head is positioned on outward facing surface of the first side of the base. The first side is generally positioned, outward facing, along the perimeter of the solar panel or solar panel array. Third, the general structure and function of the solar panel bottom clamp assembly can be achieved in as few as three parts: a base, a clamping member, and a threaded fastener. Fourth, the general principles and structure of the solar panel bottom clamp assembly can be adapted for a variety of solar panel bottom clamp assemblies and solar panel mounting devices. For example, in the Description section, the general principles and structure of solar panel mounting device are implemented with three rail-less solar panel mounting devices and a rail-less splice. The inventor also envisions that the solar panel mounting device of this disclosure can utilized for rail mounted solar panel mounting systems.

This Summary introduces a selection of concepts in simplified form that are described the Description. The Summary is not intended to identify essential features or limit the scope of the claimed subject matter.

DRAWINGS

DESCRIPTION

Figure 1:
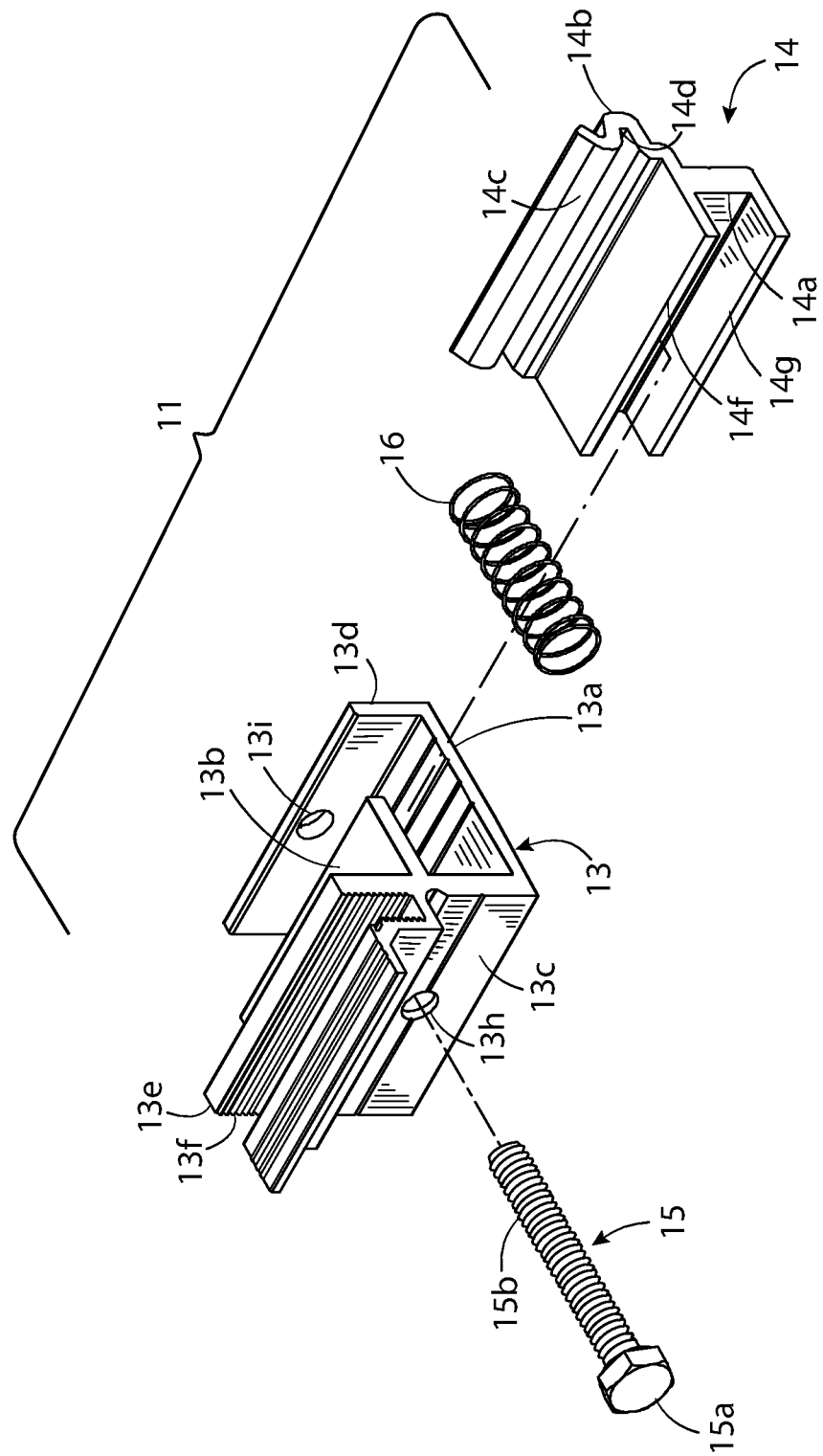
FIG. 1 illustrates an exploded top perspective view of a solar panel bottom clamp with features common to all embodiments.

The terms "left," "right," "top," "bottom," "upper," "lower," "front," "back," and "side," are relative terms used throughout the to help the reader understand the figures. Unless otherwise indicated, these do not denote absolute direction or orientation and do not imply a particular preference. Specific dimensions are intended to help the reader understand the scale and advantage of the disclosed material. Dimensions given are typical and the claimed invention is not limited to the recited dimensions.

The following terms are used throughout this disclosure and are defined here for clarity and convenience.

Solar Panel Bottom Clamp: As defined in this disclosure, a solar panel bottom clamp is a device that secures the underside (i.e. the return flange) of a solar panel frame to a solar panel mounting device. The solar panel mounting devices can be rail or rail-less.

Return Flange: As defined in this disclosure, a return flange is the lower lip portion of a solar panel frame that projects inward underneath the solar panel.

The following description is made with reference to figures, where like numerals refer to like elements throughout the several views. When a series of figures are referred to, then numerals will generally refer to all figures in the series unless the numerals are followed by figures numbers in parenthesis. Figure numbers in parenthesis indicate that only those figures within the series include the reference numerals immediately preceding the parenthesis. For brevity, the figure numbers in parenthesis will be used the first time the reference numerals are discussed within a series of figures, but not necessarily subsequent times. For example, when discussing FIGS. 1-15, grounding pin 19 is only called out in FIG. 13 and is hidden in the other views. Therefore, the first time the grounding pin 19 is referred to within a particular discussion of FIGS. 1-15, it will be referred to as grounding pin 19 (FIG. 13).

Figure 2:
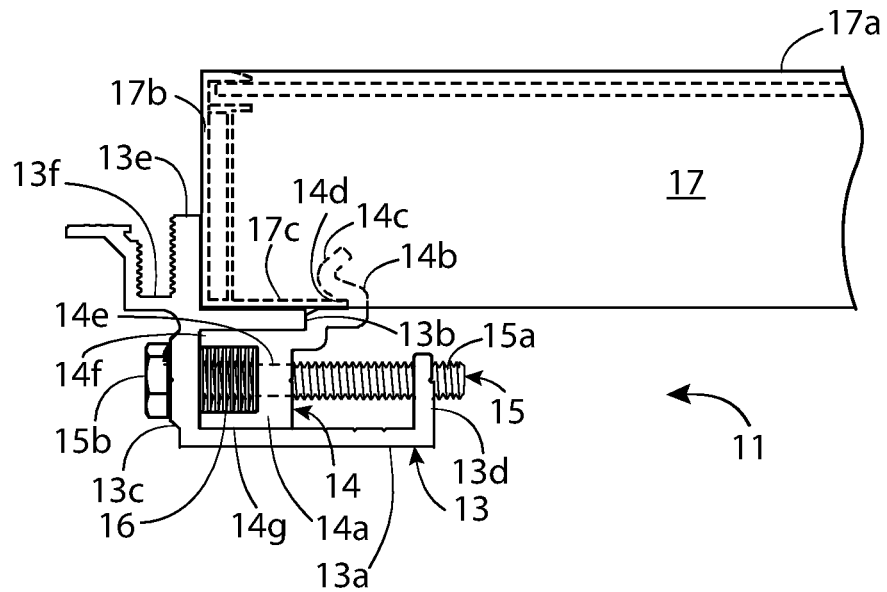
FIG. 2 illustrates a side view of a solar panel bottom clamp of FIG. 1 with the solar panel bottom clamp tightened against the solar panel frame.
Figure 3:
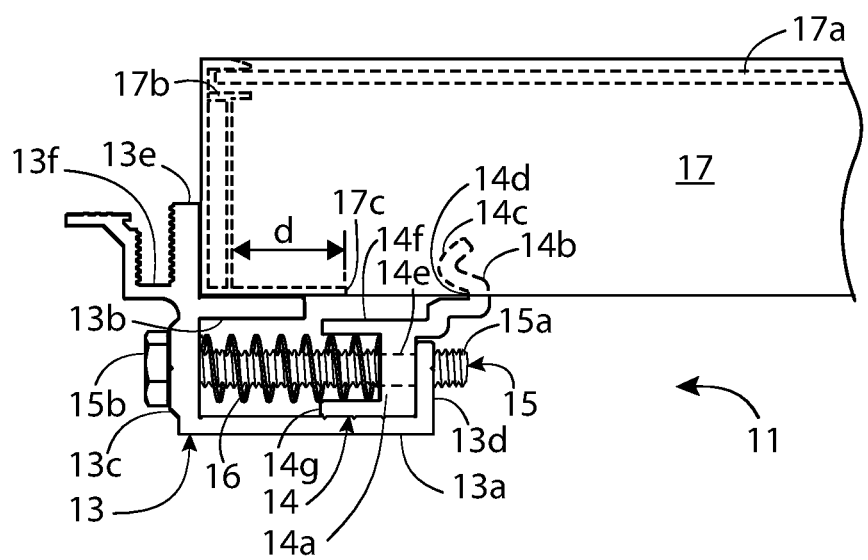
FIG. 3 illustrates a side view of the solar panel bottom clamp of FIG. 1 with the solar panel bottom clamp not tightened against the solar panel frame.

The disclosure describes a novel solar panel bottom clamp implemented in several variations of a solar panel mounting system 10. FIG. 1-3 illustrate the solar panel bottom clamp assembly 11 with features, structure, and principles common to solar panel bottom clamp assembly 21, 31, 41, 51 in the remainder of this disclosure.

Figure 4:
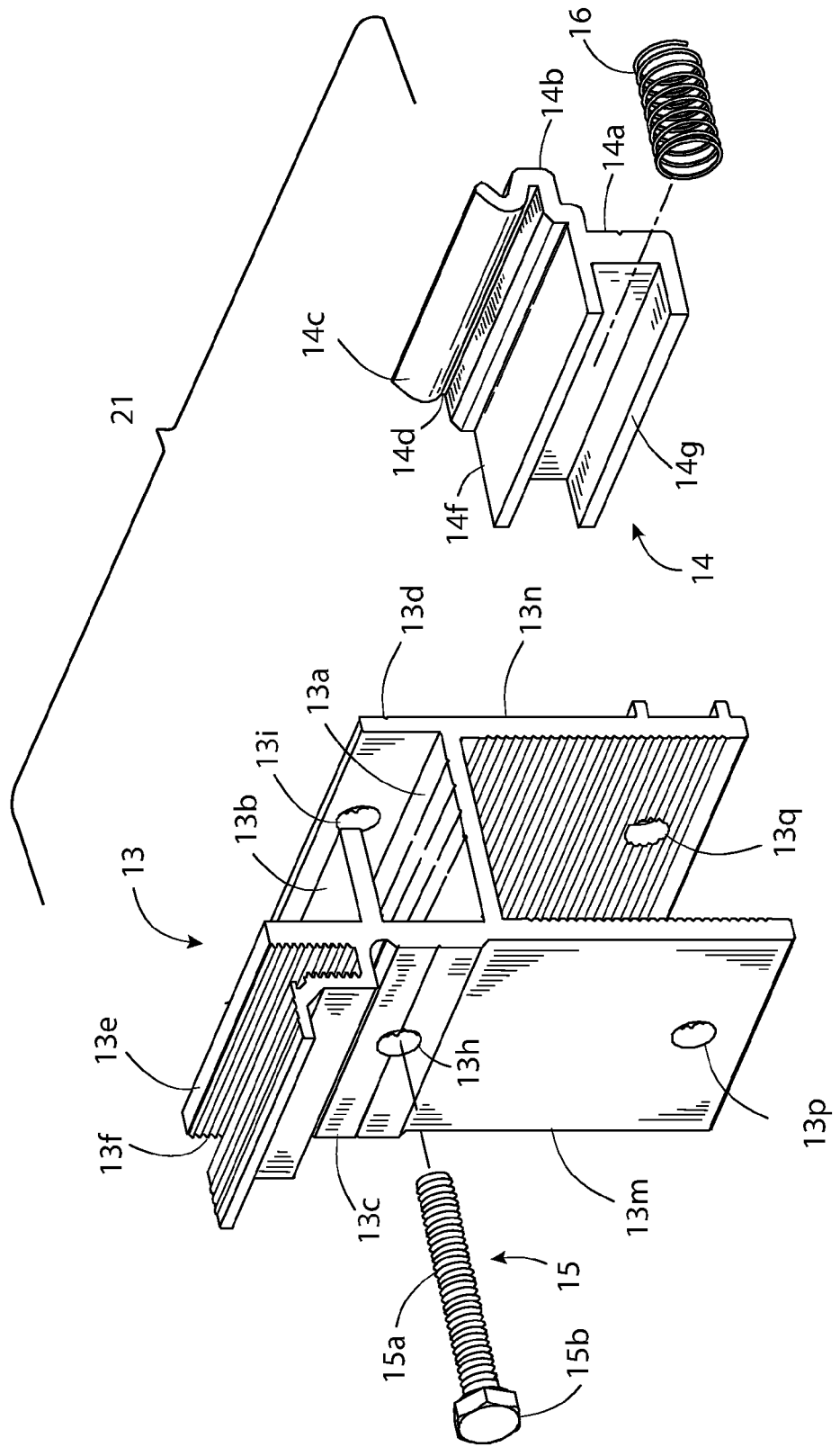
FIG. 4 illustrates an exploded top perspective view of a solar panel bottom clamp using the principles shown from FIGS. 1-3 and utilized in the solar panel mounting system of FIGS. 16-19.
Figure 5:
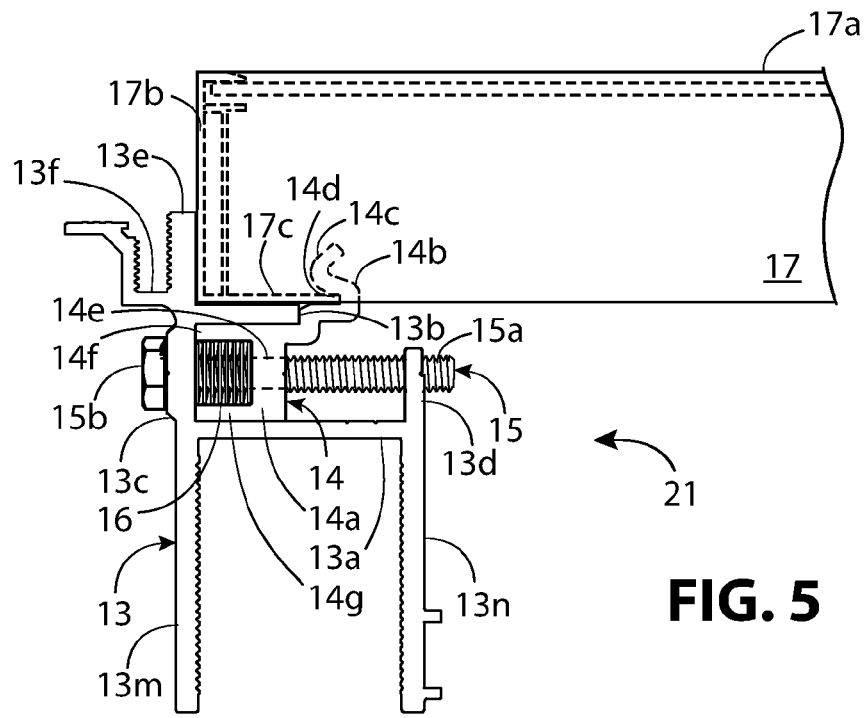
FIG. 5 illustrates a side view of a solar panel bottom clamp of FIG. 4 with the solar panel bottom clamp tightened against the solar panel frame.
Figure 6:
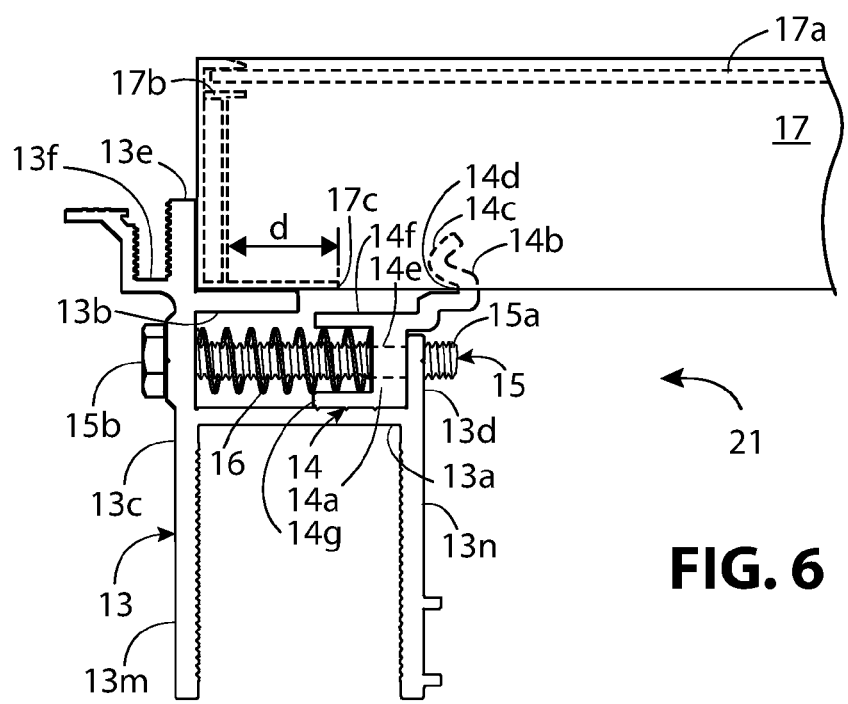
FIG. 6 illustrates a side view of the solar panel bottom clamp of FIG. 4 with the solar panel bottom clamp not tightened against the solar panel frame.
Figure 7:
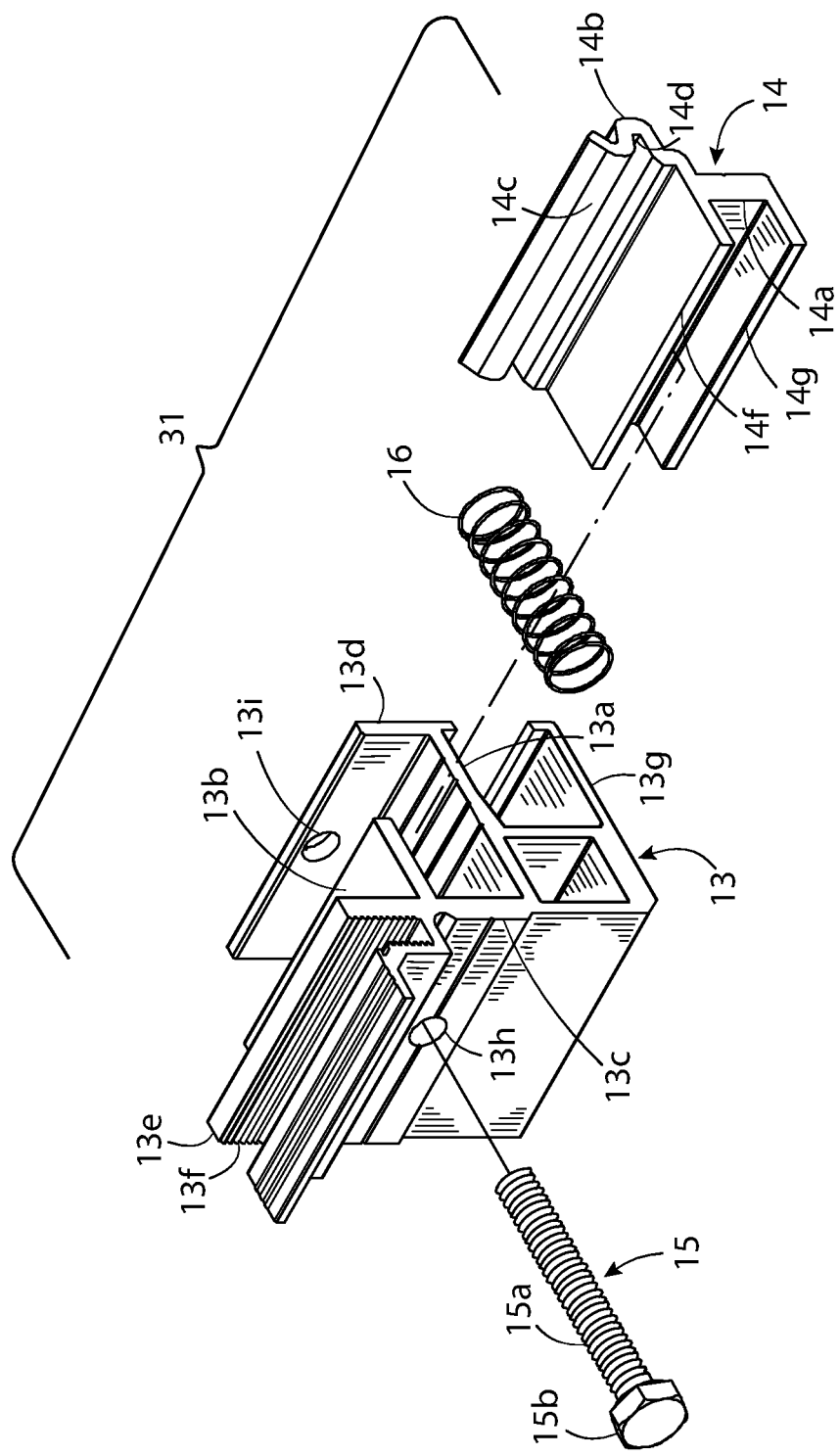
FIG. 7 illustrates an exploded top perspective view of a solar panel bottom clamp using the principles shown from FIGS. 1-3 and utilized in the solar panel mounting system of FIGS. 20-23.
Figure 8:
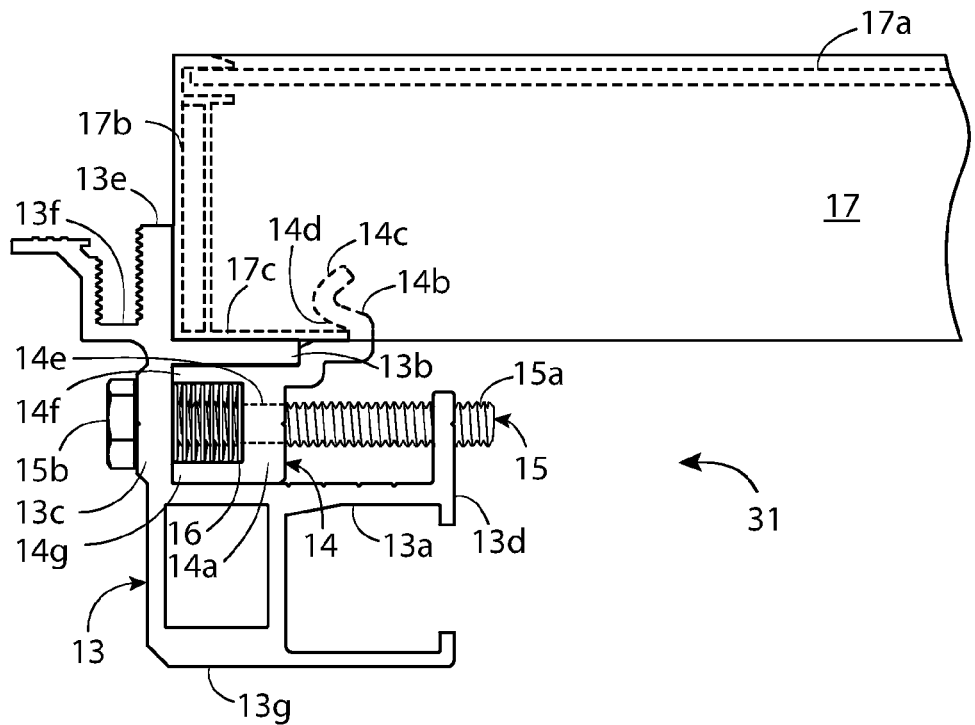
FIG. 8 illustrates a side view of a solar panel bottom clamp of FIG. 7 with the solar panel bottom clamp tightened against the solar panel frame.
Figure 9:
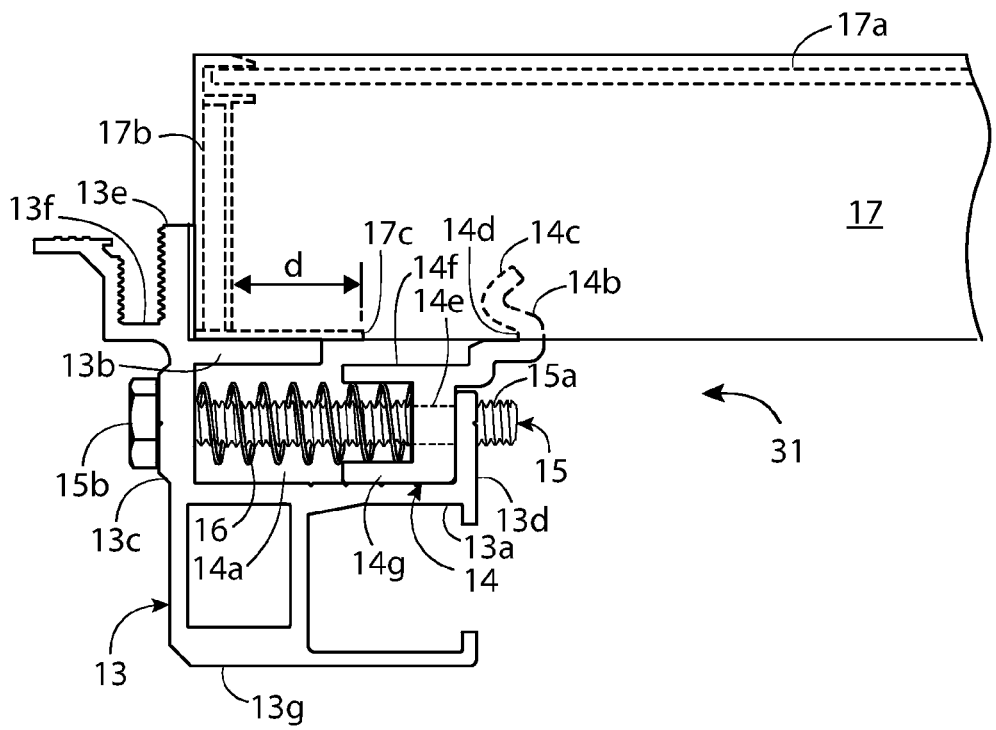
FIG. 9 illustrates a side view of the solar panel bottom clamp of FIG. 7 with the solar panel bottom clamp not tightened against the solar panel frame.
Figure 10:
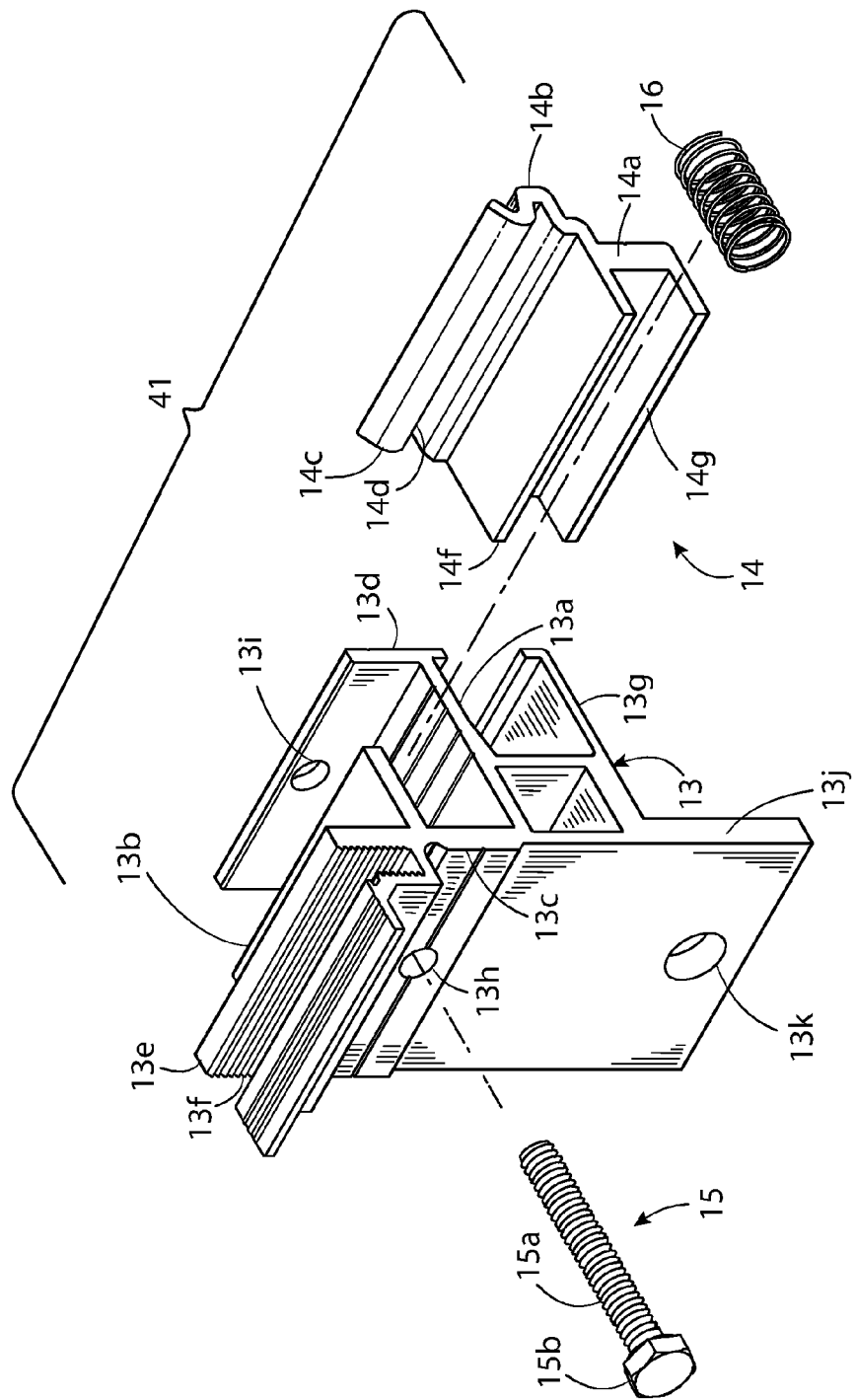
FIG. 10 illustrates an exploded top perspective view of a solar panel bottom clamp using the principles shown from FIGS. 1-3 and utilized in the solar panel mounting system of FIGS. 24-26.
Figure 11:
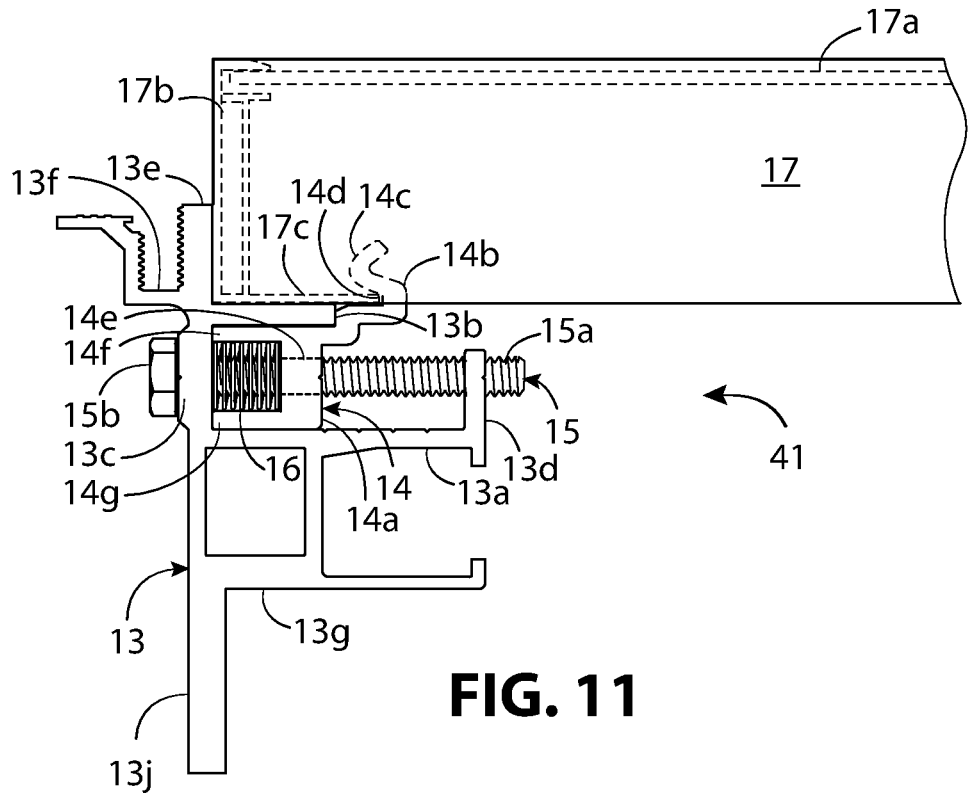
FIG. 11 illustrates a side view of a solar panel bottom clamp of FIG. 10 with the solar panel bottom clamp tightened against the solar panel frame.
Figure 12:
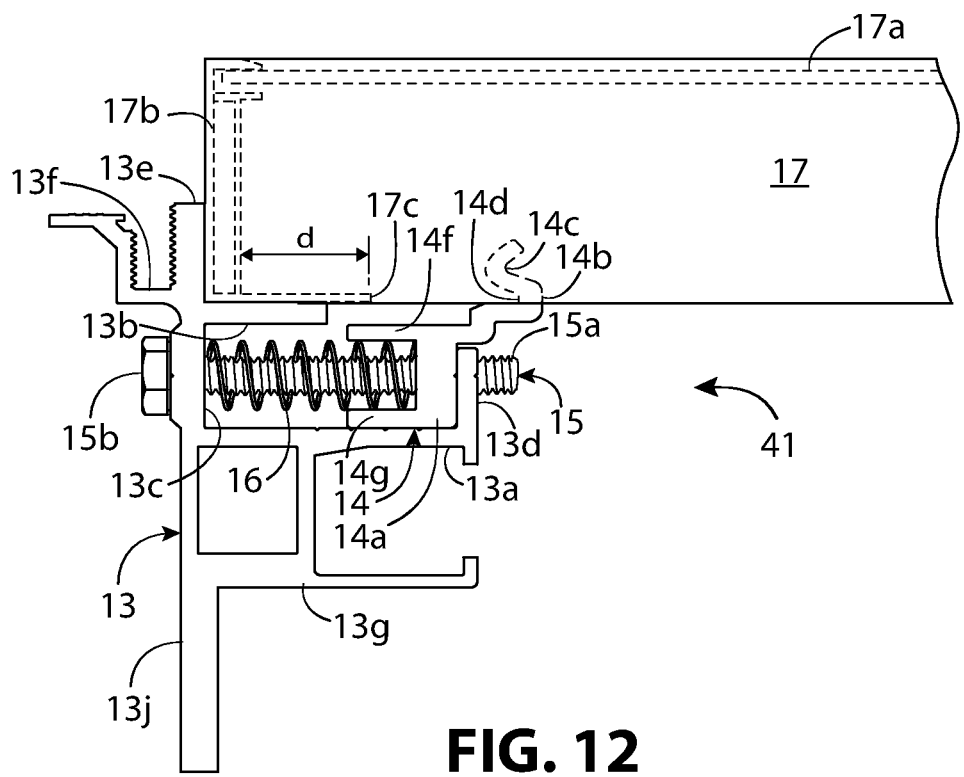
FIG. 12 illustrates a side view of the solar panel bottom clamp of FIG. 10 with the solar panel bottom clamp not tightened against the solar panel frame.
Figure 13:
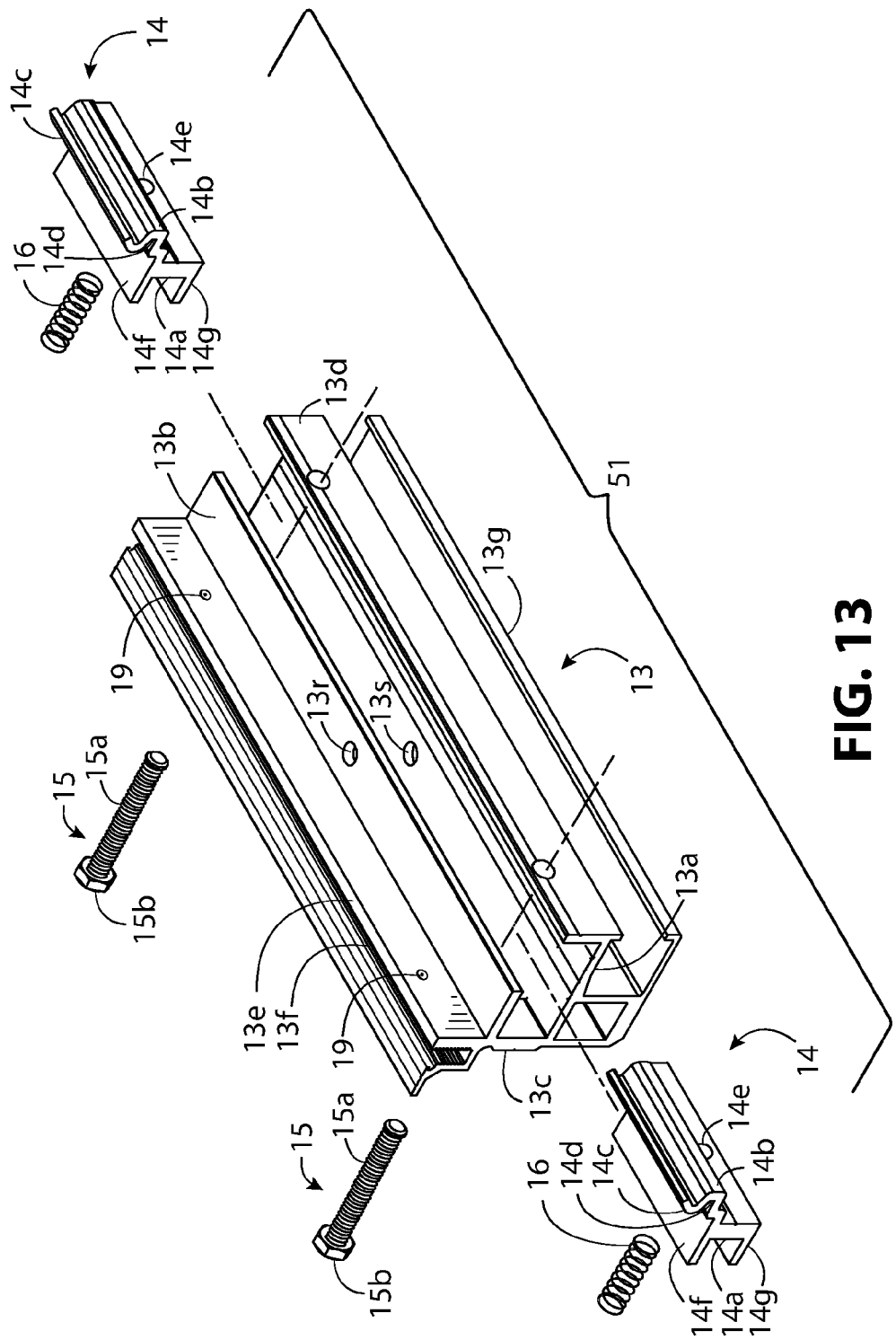
FIG. 13 illustrates an exploded top perspective view of a solar panel bottom clamp using the principles shown from FIGS. 1-3 and utilized in a rail-less splice of FIGS. 27 and 28.
Figure 14:
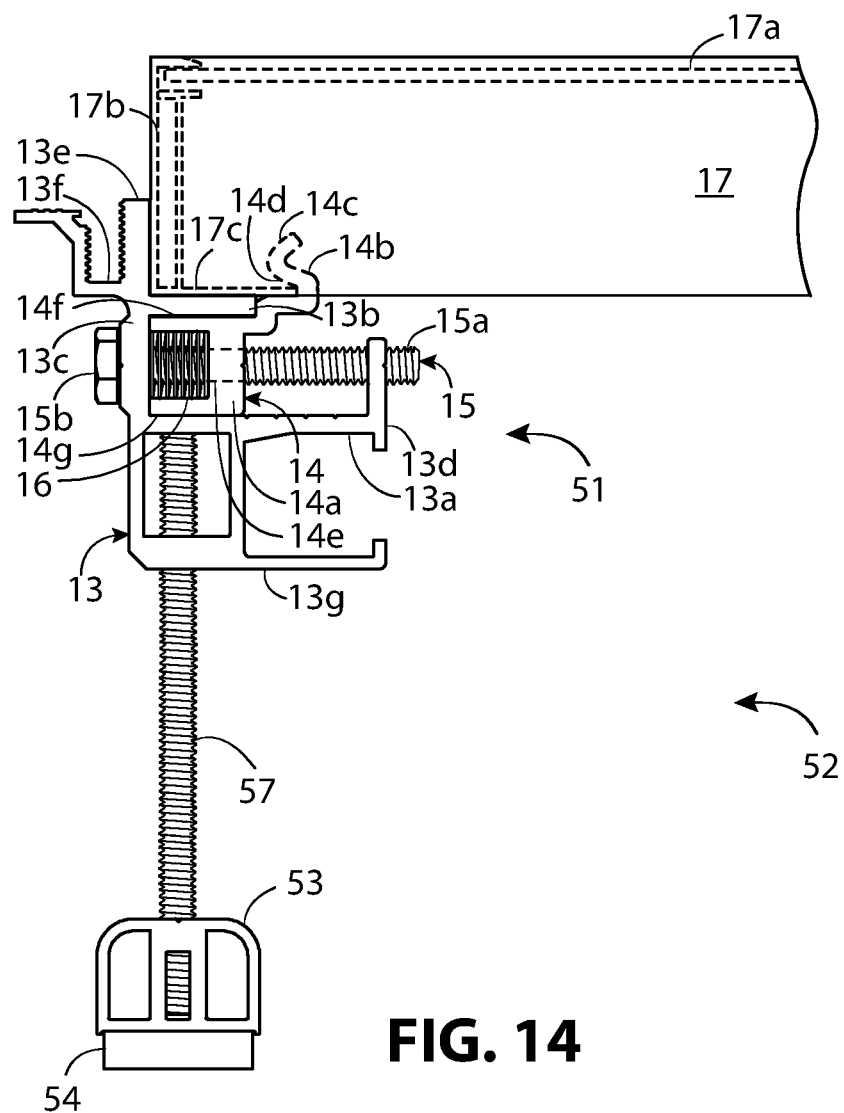
FIG. 14 illustrates a side view of a solar panel bottom clamp of FIG. 13 with the solar panel bottom clamp tightened against the solar panel frame.
Figure 15:
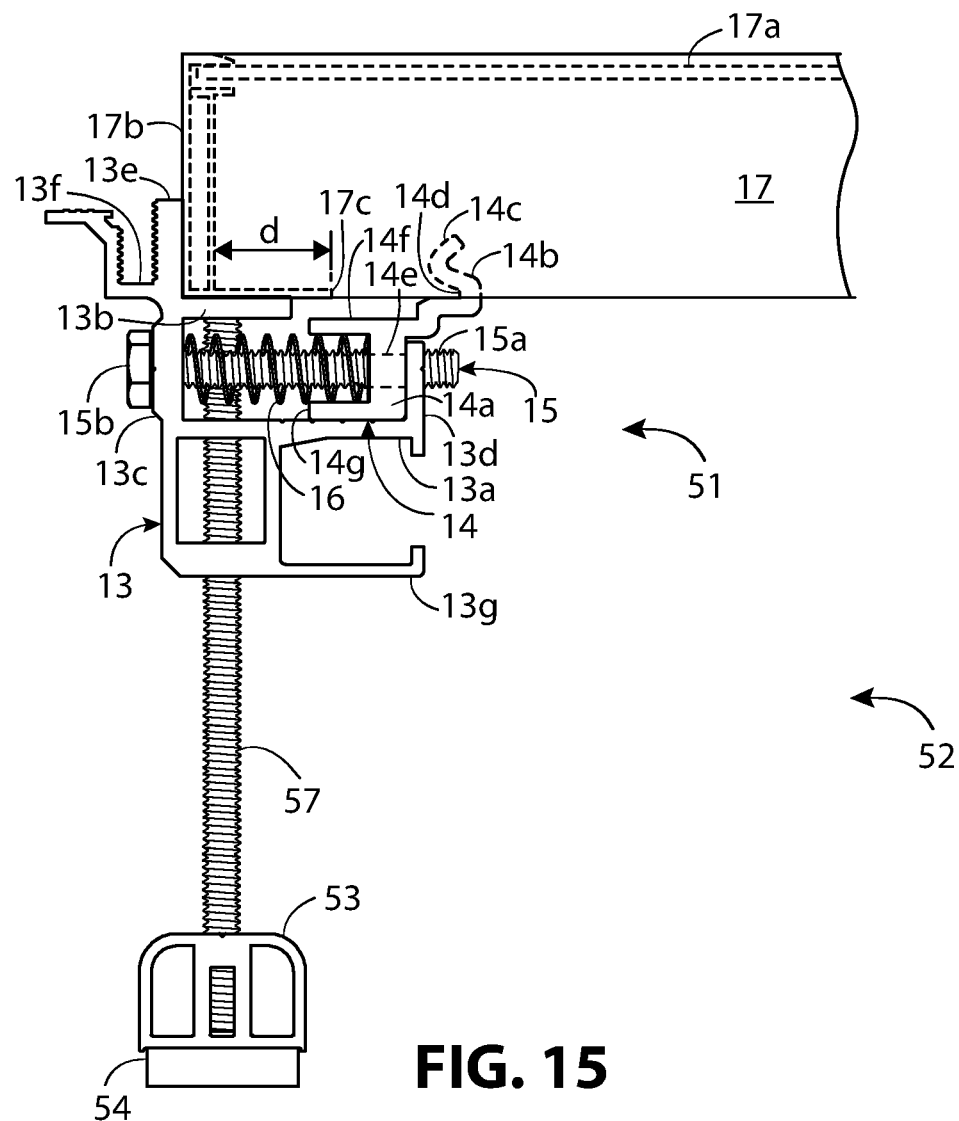
FIG. 15 illustrates a side view of the solar panel bottom clamp of FIG. 10 with the solar panel bottom clamp not tightened against the solar panel frame.

FIGS. 1-15 illustrate the both the features and operation of solar panel bottom clamp assembly 11, 21, 31, 41, 51 with FIGS. 1-3 showing a common genius and FIGS. 4-15 showing the solar panel bottom clamp assembly 21, 31, 41, 51 utilized in four embodiments. FIGS. 4-6 illustrate the solar panel bottom clamp assembly 21 utilized in rail-less solar panel mounting device 22 of FIGS. 16-19. FIG. 7-9 illustrate a solar panel bottom clamp assembly 31 utilized in a rail-less solar panel mounting device 32 of FIGS. 20-23. FIG. 10-12 illustrate a solar panel bottom clamp assembly 41 utilized in rail-less solar panel mounting device 42 of FIGS. 24-26. FIG. 13-15 illustrate a solar panel bottom clamp assembly 51 utilized in a rail-less splice 52 of FIGS. 27 and 28.

Referring to FIGS. 1-15, the solar panel bottom clamp assembly 11, 21, 31, 41, 51 include a base 13, a clamping member 14, a threaded fastener 15. Optionally, the solar panel bottom clamp assembly can optionally include a spring 16 and/or a grounding pin 19 (FIG. 13). The base 13 includes a first platform 13a, a second platform 13b, a first side 13c, a second side 13d, and a panel rest 13e, and optionally, an accessory mount 13f. The first side 13c and the second side 13d include unthreaded apertures 13h, 13i respectively (FIGS. 1, 4, 7, 10, and 13). The unthreaded apertures 13h, 13i are aligned with respect to each other and forming a line parallel to the upward-facing surface of the first platform 13a. Optionally, a grounding pin 19 can project out of the panel rest 13e (FIG. 13) to create electrical continuity between the solar panel 17 and the solar panel bottom clamp assemblies 11, 21, 31, 41, 51. The grounding pin 19 can be formed or cast as a separate component or alternatively can be extruded, cast, or otherwise formed integrally with the base. The clamping member 14 includes a clamping member body 14a and a mounting clip 14b. The mounting clip 14b includes a hooked portion 14c and an indentation 14d. The hooked portion 14c projects upward from an end of the clamping member body 14a with the hooked portion 14c projecting convexly toward the opposite end of the clamping member body 14a. The indentation 14d is positioned between an inside edge of the hooked portion 14c and the clamping member body 14a. Referring to FIGS. 2, 3, 5, 6, 8, 9, 11, 12, 14, and 15, the indentation 14d is wide enough to accommodate the thickness of a return flange 17c, i.e. the bottom lip of the solar panel frame 17b, but narrow enough to allow the hooked portion 14c of the mounting clip 14b to retain the return flange 17c. The thickness of the return flange 17c is typically 1.5 mm (0.059 inches) to 2 mm (0.079 inches). The length of the return flange extending inward from to the outer edge of the solar panel frame 17b is typically 30 mm (1.18 inches) to 45 mm (1.77 inches) and indicated by length d (FIGS. 3, 6, 9, 12, and 15). The clamping member body 14a includes a threaded aperture 14e (FIGS. 2, 3, 5, 6, 8, 9, 11, 12, 13, 14, and 15). The clamping member body 14a optionally includes a first projected portion 14f and a second projected portion 14g. The projected portions project planarly along the top and bottom outside surfaces, respectively, of the clamping member body 14a.

The threaded fastener 15 includes a fastener head 15b and a fastener body 15a. Portions of the fastener body 15a pass through unthreaded apertures 13h, 13i and threadably engage the threaded aperture 14e. The fastener head 15b seats on the outward facing surface of the first side 13c of the base. The fastener body 15a can optionally pass through the spring 16. The spring 16 can be positioned between the inward facing surface of the clamping member body 14a and the inward facing surface of the first side 13c. With this arrangement, the top and bottom surface of the clamping member body 14a, and optionally the top of the first projected portion 14f and the bottom of the second projected portion 14g, are movable along the bottom surface of the second platform 13b and the top surface of the first platform 13a.

FIGS. 2 and 3, 5 and 6, 8 and 9, 11 and 12, and 14 and 15 demonstrate the operation of the solar panel bottom clamp assembly 11, 21, 31, 41, 51 respectively. FIGS. 2 and 3 show the solar panel bottom clamp assembly 11 engaging a solar panel 17. FIGS. 5 and 6 similarly show the solar panel bottom clamp assembly 21 engaging the solar panel 17. FIGS. 8 and 9 show the solar panel bottom clamp assembly 31 engaging the solar panel 17. FIGS. 11 and 12 show the solar panel bottom clamp assembly 41 engaging the solar panel 17. FIGS.14 and 15 show the solar panel bottom clamp assembly 51 engaging a solar panel 17. Referring to FIGS. 2, 3, 5, 6, 8, 9, 11, 12, 14, and 15, the solar panel 17 includes a photovoltaic panel 17a mounted to a solar panel frame 17b, and the return flange 17c projecting inwardly from the solar panel frame 17b. The solar panel frame 17b includes a portion resting against panel rest 13e. The bottom of the return flange 17c seats against the top surface of the second platform 13b.

Referring to FIGS. 2, 5, 8, 11, and 14, as the threaded fastener 15 is tightened (i.e. turned clockwise for right-handed threading or counter-clockwise for left-handed threading), the fastener body 15a engages the clamping member 14 and pulls the clamping member 14 toward the first side 13c and away from the second side 13d of the base 13. The mounting clip 14b is moved toward the solar panel frame 17b with the indentation 14d engaging the return flange 17c, securing the solar assembly to the solar panel bottom clamp assembly 11. The spring 16 is optional. When used, the spring 16 will compress as the threaded fastener 15 is tightened.

Referring to FIGS. 3, 6, 9, 12, and 15, as the threaded fastener 15 is loosened (i.e. turned counter-clockwise for a right-handed threading or clockwise for a left-handed threading), the fastener body 15a disengages from the clamping member 14 and pulls the clamping member 14 away from the first side 13c and toward the second side 13d of the base 13. The mounting clip 14b is moved away from the solar panel frame 17b with the indentation 14d and hooked portion 14c moving away from the return flange 17c, allowing the solar panel 17 disengage or be removed from the solar panel bottom clamp assembly 11. If the spring 16 is optionally used, it will decompress as the threaded fastener 15 is loosened. The spring 16 helps to create smooth engagement and disengagement of the return flange 17c by the mounting clip 14b by creating spring force in the direction disengagement. This creates more tension engaging as opposed to disengaging the return flange 17c.

Referring to FIGS. 2, 3, 5, 6, 8, 9, 11, 12, 14, and 15, it should be noted that the threaded fastener spins freely within the unthreaded apertures 13h, 13i. While the fastener body 15a of FIGS. 1-15, as illustrated, is threaded along its entire length, it does not need to be threaded at the end portions that engage the unthreaded apertures 13h, 13i. For example, the portion of the fastener body 15a closest to the fastener head 15b with a length approximate to the thickness of the first side 13c of the base 13 can be unthreaded. Likewise, the end of the fastener body 15a that is distal to the fastener body 15a can be unthreaded from the end into the portion engaging the second side 13d. The threaded fastener 15 can optionally be rotatably secured to the base 13 by a retainer. The retainer can be, for example, a cotter pin engaging an aperture through the diameter of the fastener body 15a, a retaining clip engaging a groove in the fastener body 15a, or other equivalent retaining hardware.

The differences in structure between the solar panel bottom clamp assembly 11, 21, 31, 41, 51 of FIGS. 1-3, FIGS. 4-6, FIGS. 7-9, FIGS. 10-12, and FIGS. 13-15, respectively, has to do with mounting adaptations for the various solar panel mounting devices. The addition of the additional structural elements does not change the clamping function of the solar panel bottom clamp assemblies 21, 31, 41, 51 as compared with the solar panel bottom clamp assembly 11. The clamping member 14, the threaded fastener 15, and the portion of the base 13 illustrated in FIGS. 1-3 can remain the same.

As compared with the solar panel bottom clamp assembly 11 of FIGS. 1-3, the solar panel bottom clamp assembly 21 of FIGS. 4-6 further includes a first extension 13m extending directly downward along the first side 13c below the first platform 13a and a second extension 13n extending directly downward along the second side 13d below the first platform 13a. The first extension 13m and the second extension 13n are both parallel to each other and each make a right-angle with respect to the first platform 13a. The first extension 13m and the second extension 13n can include serrations on their inward facing surfaces to help create a better gripping surface. The first extension 13m and the second extension include apertures 13p, 13q (FIG. 4) respectively. Apertures 13p, 13q can be aligned in a plane parallel to the first platform 13a. The purpose of the first extension 13m and the second extension 13n is to provide a mounting portion to attach to the solar panel bottom clamp assembly 21 to a mounting device. For example, in FIGS. 18 and 19, the lower base 13g attaches to a sliding member 25 portion of the rail-less solar panel mounting device 22 via a threaded fastener 27 and threaded retainer 77. Optionally, wire channels can project away from the first extension 13m, the second extension, or both 13n. The optional wire channels can be u-shaped, v-shaped, or any other suitable shape for holding electrical wires. For example, in FIG. 17, one or both of the wire channels 23a, 23b of the rail-less solar panel mounting device 23, can be directly applied to the rail-less solar panel mounting device 22 in the same or similar manner as shown. These optional wire channels can be integrally extruded, cast, molded, or otherwise formed with the base 13. Alternatively, the can be separately extruded, cast, molded, or otherwise formed and attached to the base, for example, attached by threaded fasteners, welding, rivets, or snap attachments.

Figure 22:
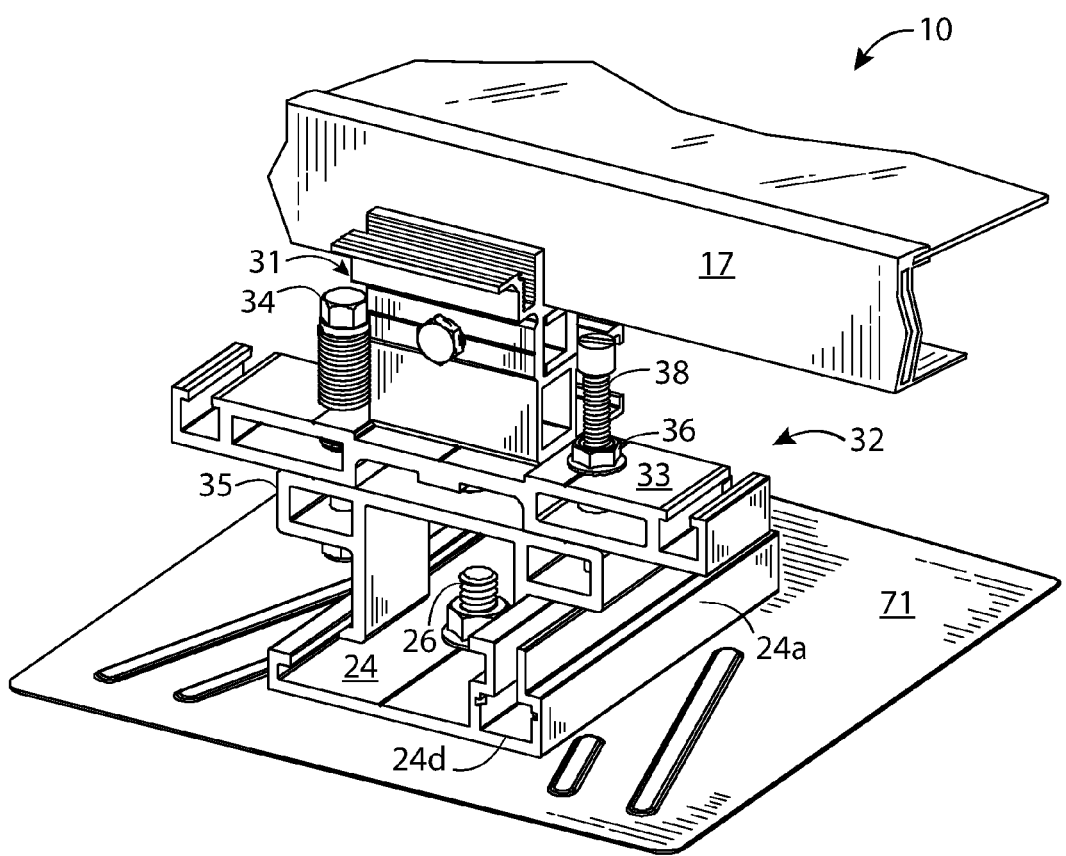
FIG. 22 illustrates an enlarged view of a portion of the solar panel mounting system taken along detail XXII in FIG. 20 and showing the solar panel bottom clamp securing a solar panel to a rail-less solar panel mounting device.
Figure 23:
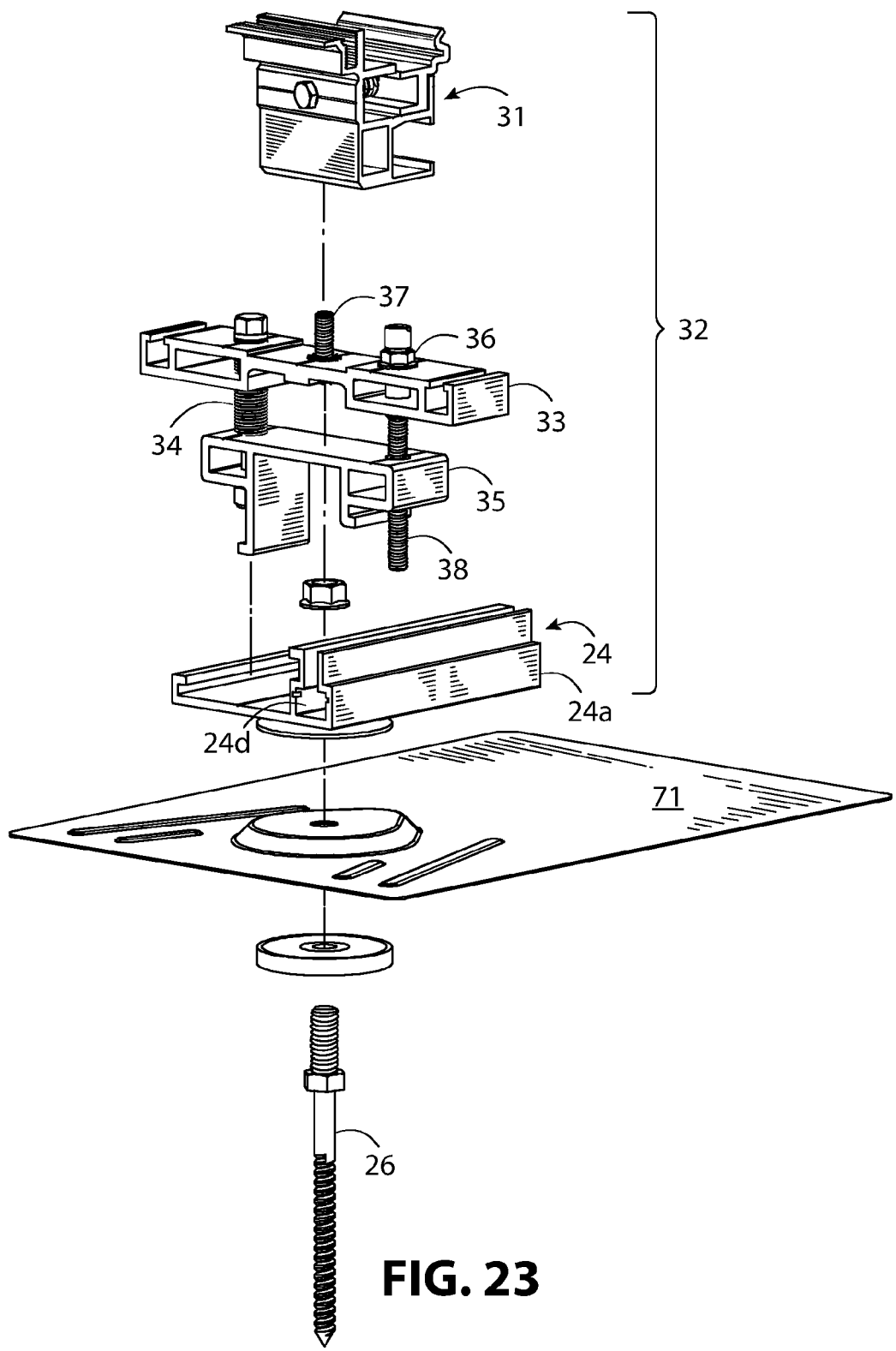
FIG. 23 illustrates an exploded top perspective view of the rail-less solar panel mounting device of FIG. 20 utilizing the solar panel bottom clamp of FIG. 10.

As compared with the solar panel bottom clamp assembly 11 of FIGS. 1-3, the solar panel bottom clamp assembly 31 of FIGS. 7-9 further includes a lower base 13g. The purpose of the lower base 13g is to provide both height adjustment and an attachment aperture (not shown) between the solar panel bottom clamp assembly 31 and a mounting device. For example, in FIGS. 22 and 23, the solar panel bottom clamp assembly 31 attaches to the pedestal 33 of the rail-less solar panel mounting device 32 via a threaded fastener 37 (FIG. 23).

As compared with the solar panel bottom clamp assembly 11 of FIGS. 1-3, the solar panel bottom clamp assembly 41 of FIGS. 10-12 further includes the lower base 13g as described above, an extension 13j of the first side 13c extending directly downward below the lower base 13g, and an aperture 13k (FIG. 10) extending through the extension 13j. As illustrated, the extension 13j can make a right-angle with the lower base 13g. The purpose of the extension 13j is to provide an attachment to a mounting device. For example, in FIG. 26, the extension 13j of the solar panel bottom clamp assembly 41, is secured to an L-foot bracket 44 with a threaded fastener 47 and threaded retainer 48.

As compared with the solar panel bottom clamp assembly 11 of FIGS. 1-3, the solar panel bottom clamp assembly 51 of FIGS. 13-15 further includes the lower base 13g as previously described, and apertures 13r, 13s (FIG. 13). Apertures 13r is positioned through the second platform 13b and aperture 13s is positioned through the first platform. In addition, the solar panel bottom clamp assembly 51 is extruded length-wise long enough to accommodate two or more of the clamping members 14 and to span a gap between solar panels. For example, in FIG. 13, the length of the solar panel bottom clamp is illustrated as being at least twice the length of the solar panel bottom clamp assembly 11 of FIG. 1 and is shown accommodating two of the clamping members 14 each with a threaded fastener 15 and optionally, each with a spring 16. The purpose of the extended length, use of two of the clamping members 14, and the addition of the lower base 13g is to provide attachment to a solar panel mounting device. For example, in FIGS. 27 and 28, the solar panel bottom clamp assembly 51 is utilized in a rail-less splice 52 where it is attached to a splice base 53 via a threaded fastener 57.

Referring to FIGS. 1-15, the solar panel bottom clamp assembly 11, 21, 31, 41, 51 has many advantages. First, the solar panel 17 can be pre-placed against the top of the second platform 13b and the inward facing surface of the panel rest 13e. The clamp can then be adjusted to secure the solar panel 17. In contrast, solar panel mounting systems with fixed position clamps, require that the panel itself be tilted and moved to engage the return flange 17c to their clip or clamp. Second, the solar panel installer can have easy access to both secure and disengage the solar panel 17 to the solar panel bottom clamp assembly. The fastener head 15b is positioned on outward facing surface of the first side 13c of the base 13. The first side 13c is generally positioned outward facing along the perimeter of the solar panel array. Third, the general structure and function of the solar panel bottom clamp assembly can be achieved in as few as three parts: a base 13, a clamping member 14, and a threaded fastener 15. Fourth, the general principles and structure of the solar panel bottom clamp assembly 11 illustrated in FIGS. 1-3, can be adapted for a variety of solar panel bottom clamp assemblies and solar panel mounting devices. For example, as demonstrated, the solar panel bottom clamp assembly 21, 31, 41, 51 of FIGS. 4-15 use the principles and structure of the solar panel bottom clamp assembly 11. The rail-less solar panel mounting device 22 of FIGS. 16-19, the rail-less solar panel mounting device 32 of FIGS. 20-23, the rail-less solar panel mounting device 42 of FIGS. 24-26, and the rail-less splice 52 of FIGS. 27 and 28 use the solar panel bottom clamp assembly 21, 31, 41, 51 respectively.

Figure 16:
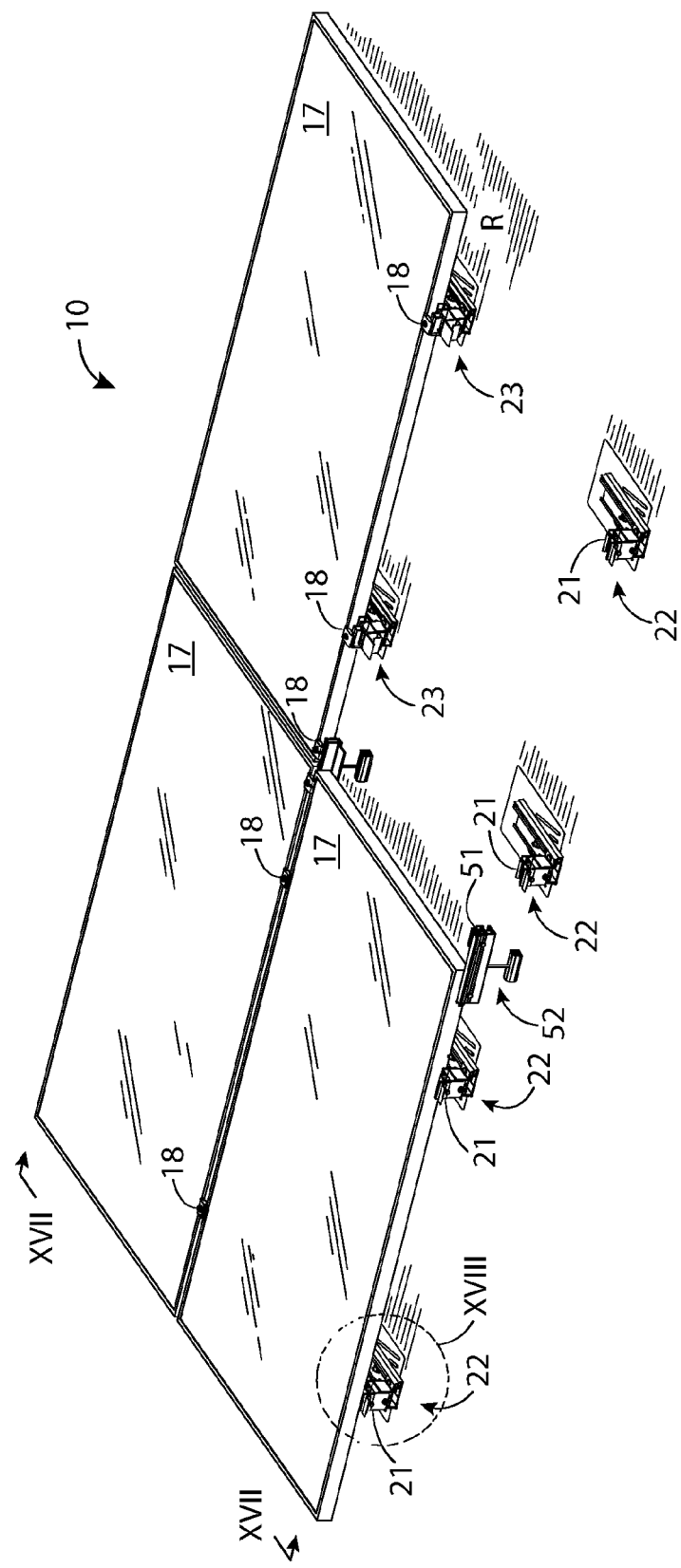
FIG. 16 illustrates a top perspective view of a solar panel mounting system utilizing the solar panel bottom clamp of FIG. 4.
Figure 17:
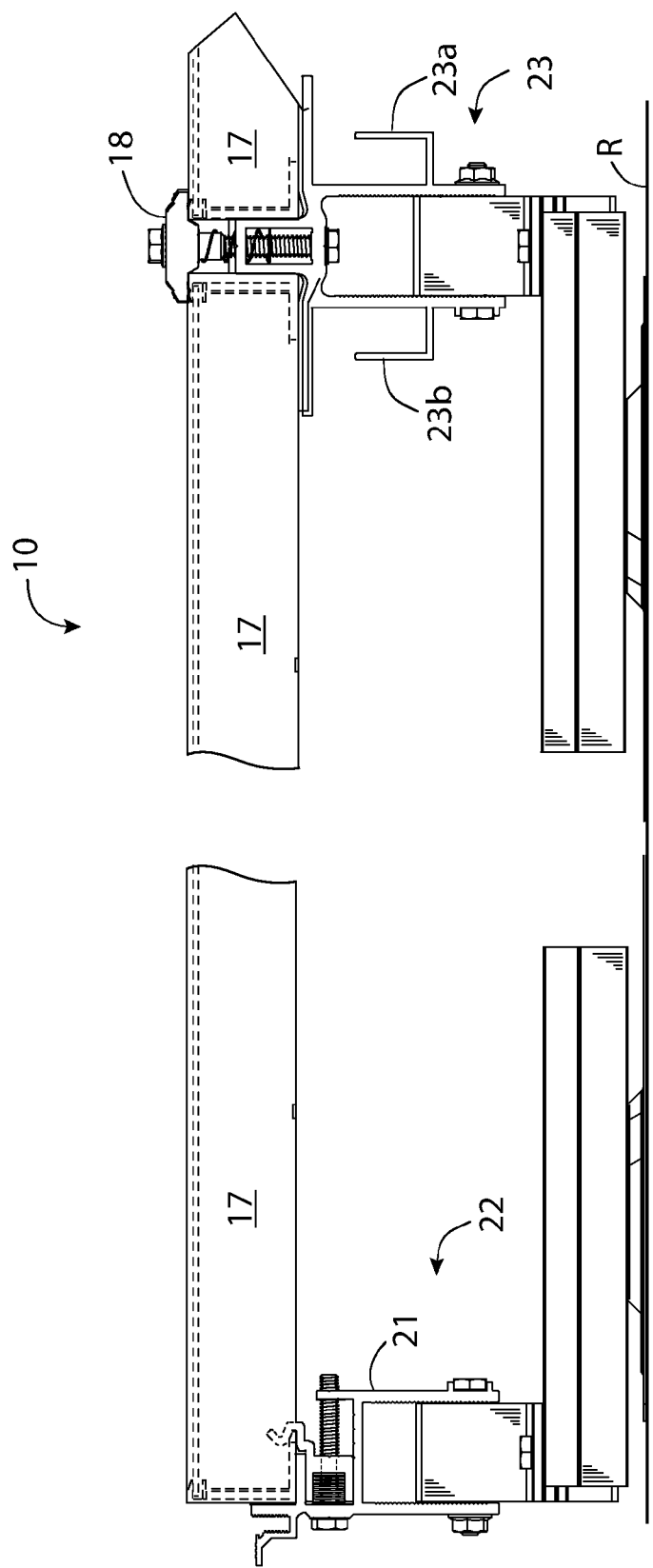
FIG. 17 illustrates a side elevation view taken along sight-lines XVII-XVII in FIG. 16.
Figure 18:
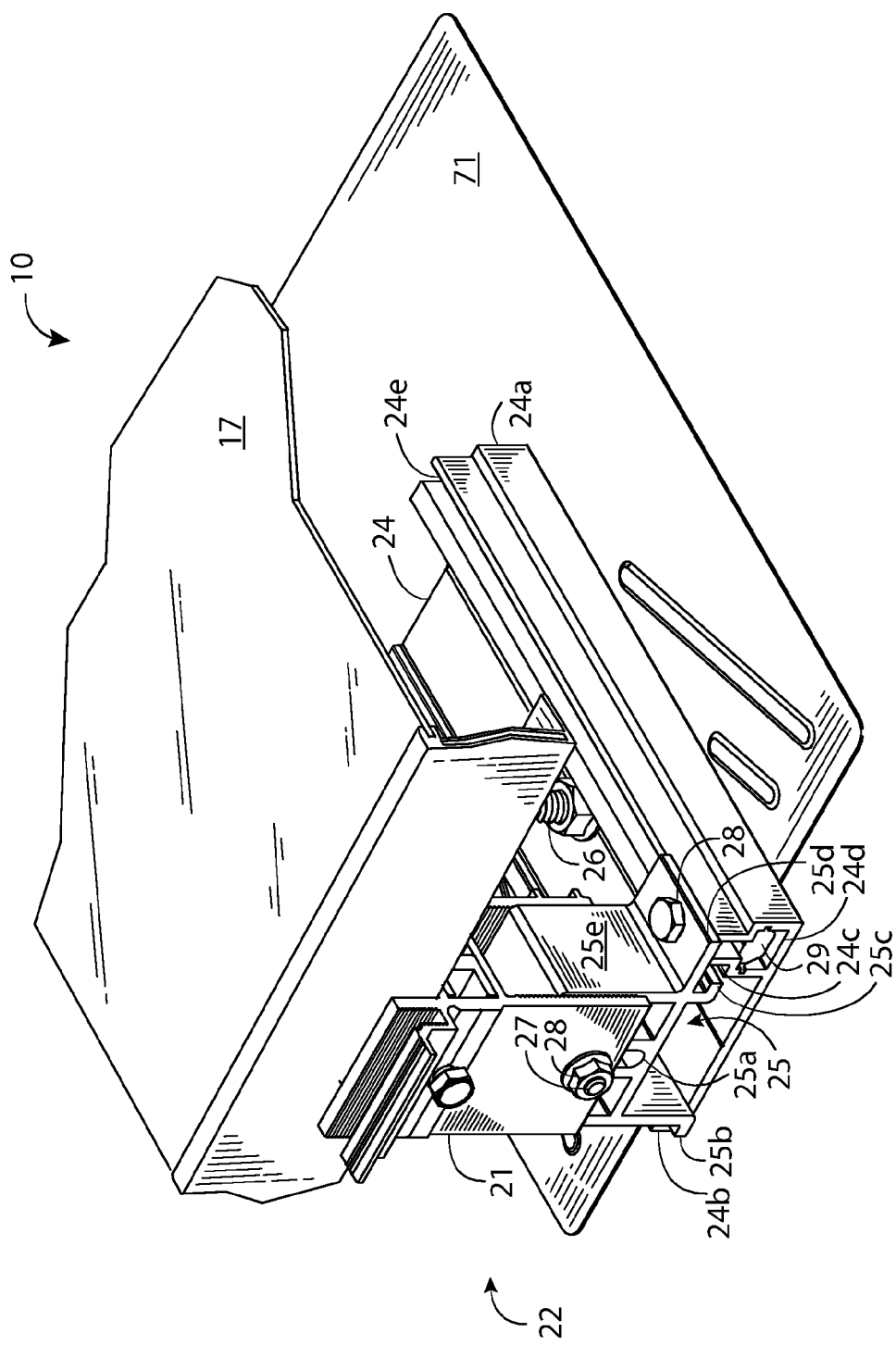
FIG. 18 illustrates an enlarged view of a portion of the solar panel mounting system taken along detail XVIII in FIG. 16 and showing the solar panel bottom clamp securing a solar panel to a rail-less solar panel mounting device.
Figure 19:
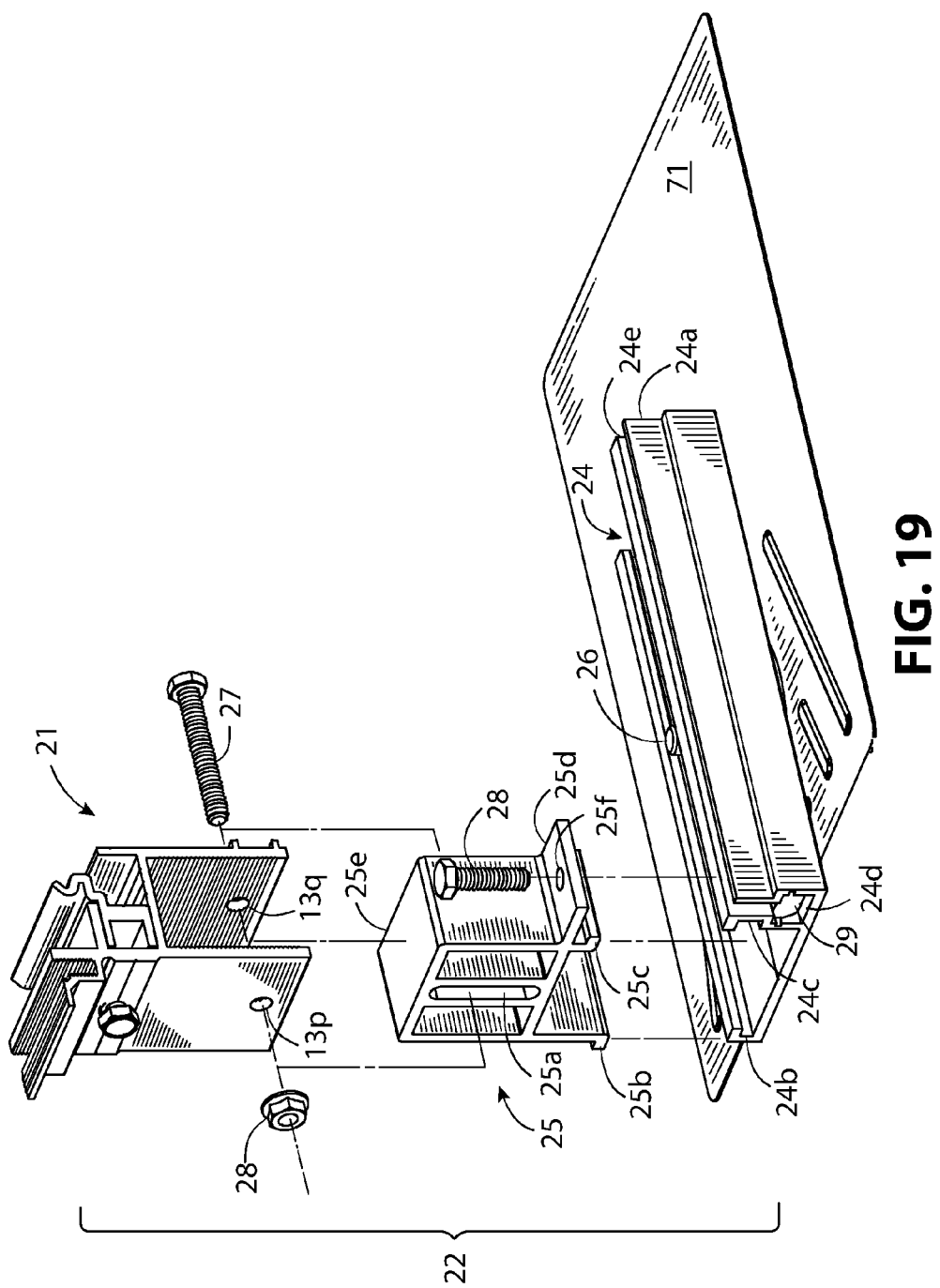
FIG. 19 illustrates an exploded top perspective view of the rail-less solar panel mounting device of FIG. 16 utilizing the solar panel bottom clamp of FIG. 4.

FIG. 16 illustrates a top perspective view of a solar panel mounting system 10 utilizing the solar panel bottom clamp assembly 21. One of the solar panels 17 is removed for illustrative clarity. FIG. 17 illustrates a side elevation view of the solar panel mounting system 10 of FIG. 16. FIG. 18 illustrates an enlarged view of a portion of the solar panel mounting system 10 showing the solar panel bottom clamp assembly 21 securing the solar panel 17 to a rail-less solar panel mounting device 22. FIG. 19 illustrates an exploded top perspective view of the rail-less solar panel mounting device 22. Referring to FIGS. 16 and 17, the solar panel bottom clamp assembly 21 in combination with the rail-less solar panel mounting device 22 attaches to the solar panels 17 to the roof R, along the outside perimeter of the solar panels 17. Between the solar panels 17, a mid-clamp 18 can secure the solar panels to a rail-less solar panel mounting device 23. In FIG. 16, the solar panel bottom clamp assembly 51 in combination with the rail-less splice 52 attaches to the solar panels 17 along their outside perimeter.

Referring to FIGS. 18 and 19, the solar panel bottom clamp assembly includes a mounting base 24 and a sliding member 25 that is slidably captive along the mounting base 24 via a first hook arm 25b and a second hook arm 25c of the sliding member 25 slidably engaging a first groove 24b and a second groove 24c of the mounting base 24, respectively. The first groove 24b and the second groove 24c can be opposing inward facing c-shapes, and the first hook arm 25b and the second hook arm 25c can be opposing outward facing L-shapes, as illustrated. The second groove 24c is positioned on an outside and inward facing portion of an upward-facing channel 24a. The upward-facing channel 24a includes a lower cavity 24d. The lower cavity 24d is wider than the channel opening 24e that runs length-wise along the upward-facing channel 24a. The sliding member 25 further includes a platform 25d projecting away from the main body 25e of the sliding member. The platform 25d is slidable along the top of the upward-facing channel 24a. The sliding member 25 is slidably lockable with the mounting base 24 via a threaded fastener 28 that engages a threaded retainer 29 through an aperture 25f in the pedestal. The threaded retainer 29 is so shaped, so that it is slidably captive within a lower cavity 24d of the upward-facing channel 24a. The threaded fastener 28 can be tightened so it extends beyond the threaded retainer 29 and engages the lower cavity 24d causing the sliding member 25 to lock against the mounting base 24. The mounting base 24 is shown secured to flashing 71 and to the roof by a threaded fastener 26. The solar panel bottom clamp assembly 21 via apertures 13p, 13q (FIG. 19) is secured to the sliding member 25 by a threaded fastener 27 and a threaded retainer 77, such as a nut. The solar panel bottom clamp assembly 21 is height adjustable via the threaded fastener 27 passing through a slotted aperture 25a.

Figure 20:
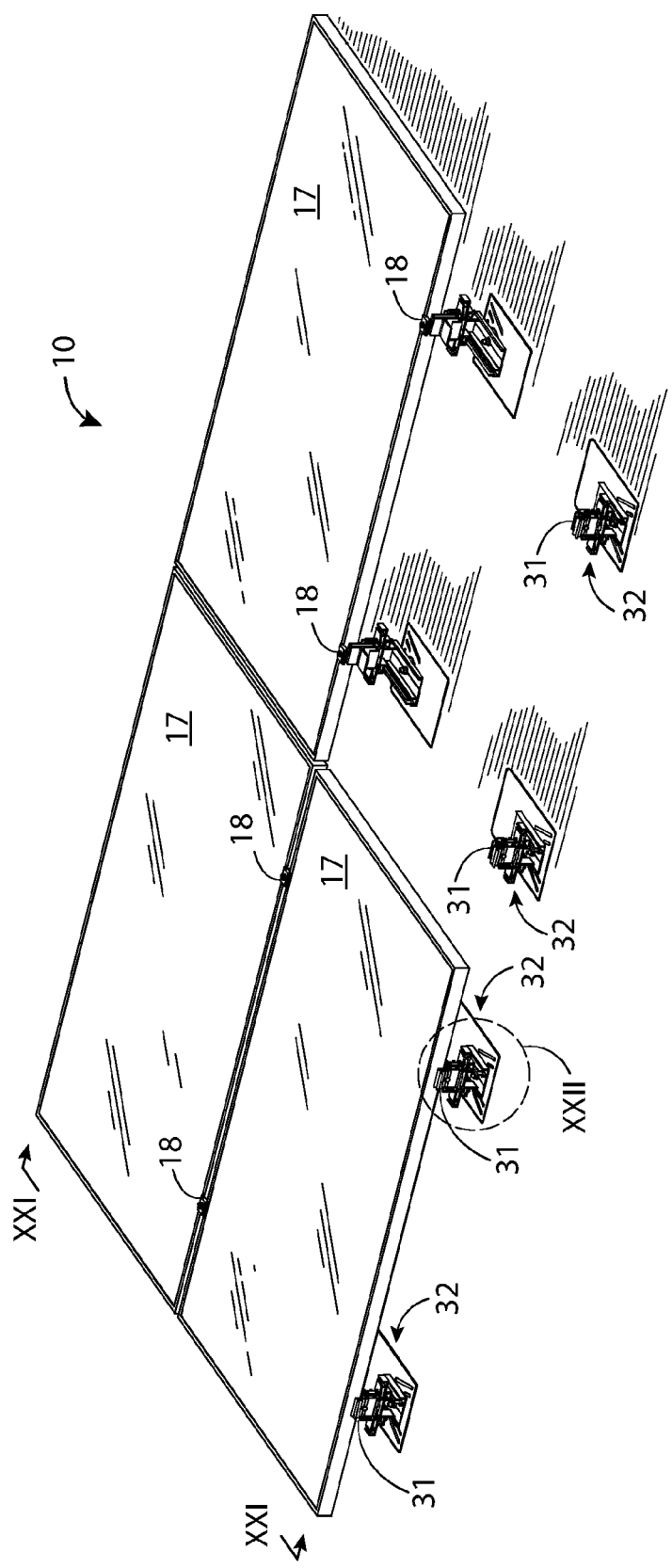
FIG. 20 illustrates a top perspective view of a solar panel mounting system utilizing the solar panel bottom clamp of FIG. 7.
Figure 21:
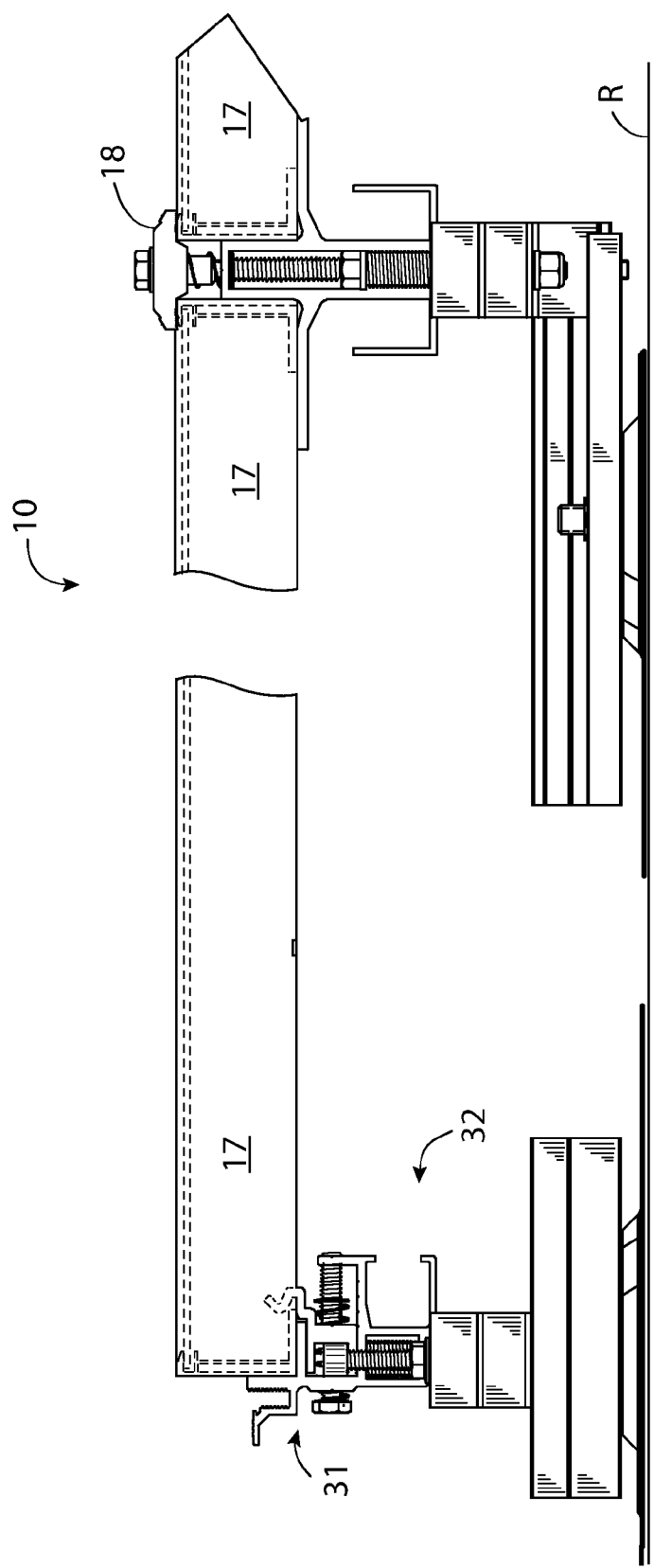
FIG. 21 illustrates a side elevation view taken along sight-lines XXI-XXI in FIG. 20.

FIG. 20 illustrates a top perspective view of the solar panel mounting system 10 utilizing the solar panel bottom clamp assembly 31. FIG. 21 illustrates a side elevation view of the solar panel mounting system 10 of FIG. 20 showing the solar panels secured to the peripheral edge of the solar panel array with the rail-less solar panel mounting device 32 utilizing solar panel bottom clamp assembly 31. A mid-clamp 18, ties together two of the solar panels 17. FIG. 22 illustrates an enlarged view of a portion of the solar panel mounting system 10 showing the solar panel bottom clamp assembly 31 securing the solar panel 17 to a rail-less solar panel mounting device 32. FIG. 23 illustrates an exploded top perspective view of the rail-less solar panel mounting device 32.

Referring to FIGS. 22 and 23, the rail-less solar panel mounting device 32 includes a pedestal 33, a mounting base 24, and a sliding member 35. The mounting base 24 of FIGS. 22 and 23 can be structurally the same as the mounting base 24 of FIGS. 18 and 19. The mounting base 24 can attach to the roof via a threaded fastener 26 and flashing 71. The sliding member 35 is captively slidable with the mounting base 24 as described for the sliding member 25 and mounting base 24 of FIGS. 18 and 19. Similarly, the sliding member 35 is lockable to the mounting base 24 using a threaded fastener 38 that engages a threaded retainer, hidden from view, within the lower cavity 24d of the upward-facing channel 24a of the mounting base 24. The height between the solar panel 17 (FIG. 22) and the roof can be adjusted by a height-adjuster 34. The height-adjuster 34 includes a threaded portion that threadably engages the pedestal 33 and it is non-threaded portion that rotationally engages and is retained to the sliding member 35. Rotational movement of the height-adjuster 34 moves the pedestal up or down with respect the mounting base 24. A through-hole standoff 36 threadably engages the threaded fastener 38 and can lock the maximum extent of upward movement of the pedestal 33 with respect to the sliding member 35 and the mounting base 24.

Figure 24:
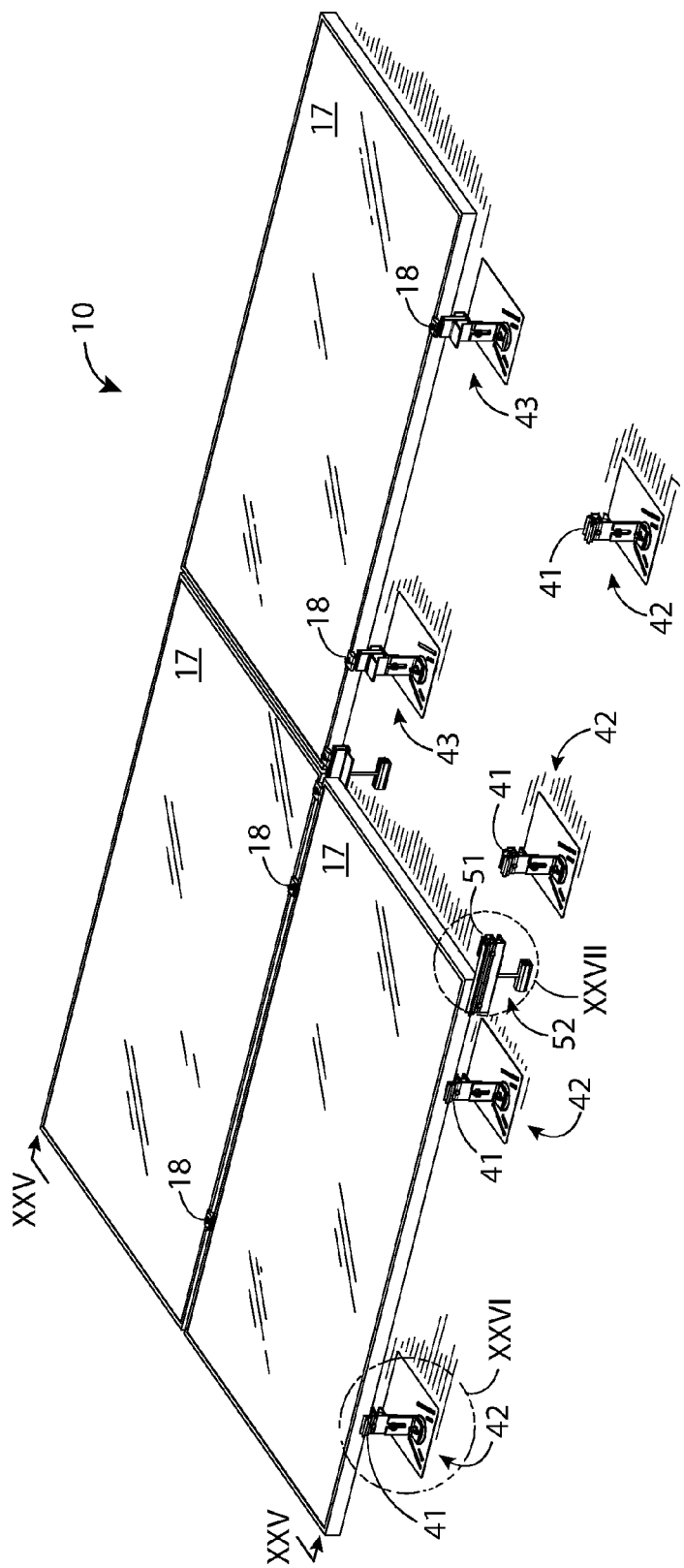
FIG. 24 illustrates a top perspective view of a solar panel mounting system utilizing the solar panel bottom clamp of FIG. 10 and a solar panel rail-less splice of FIG. 13.
Figure 25:
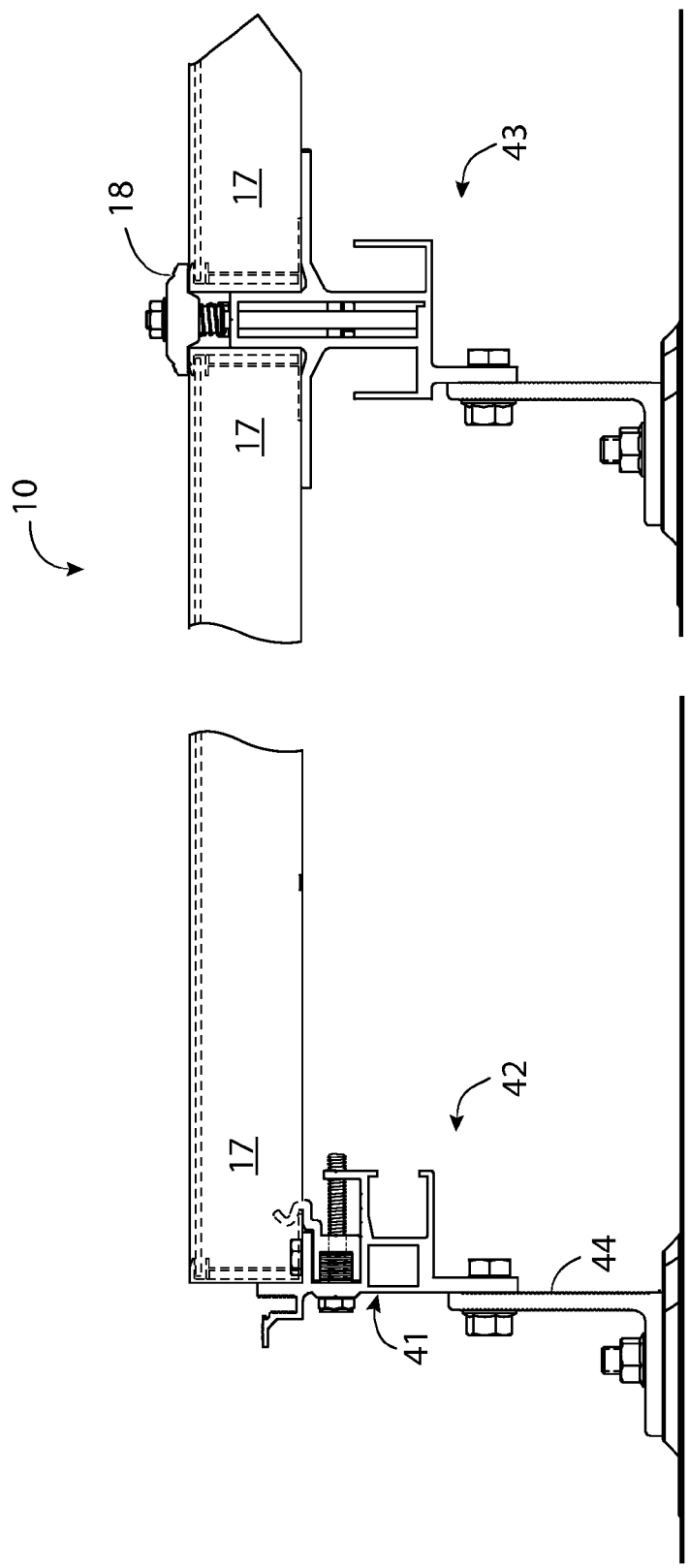
FIG. 25 illustrates a side elevation view taken along sight-lines XXV-XXV in FIG. 24.
Figure 26:
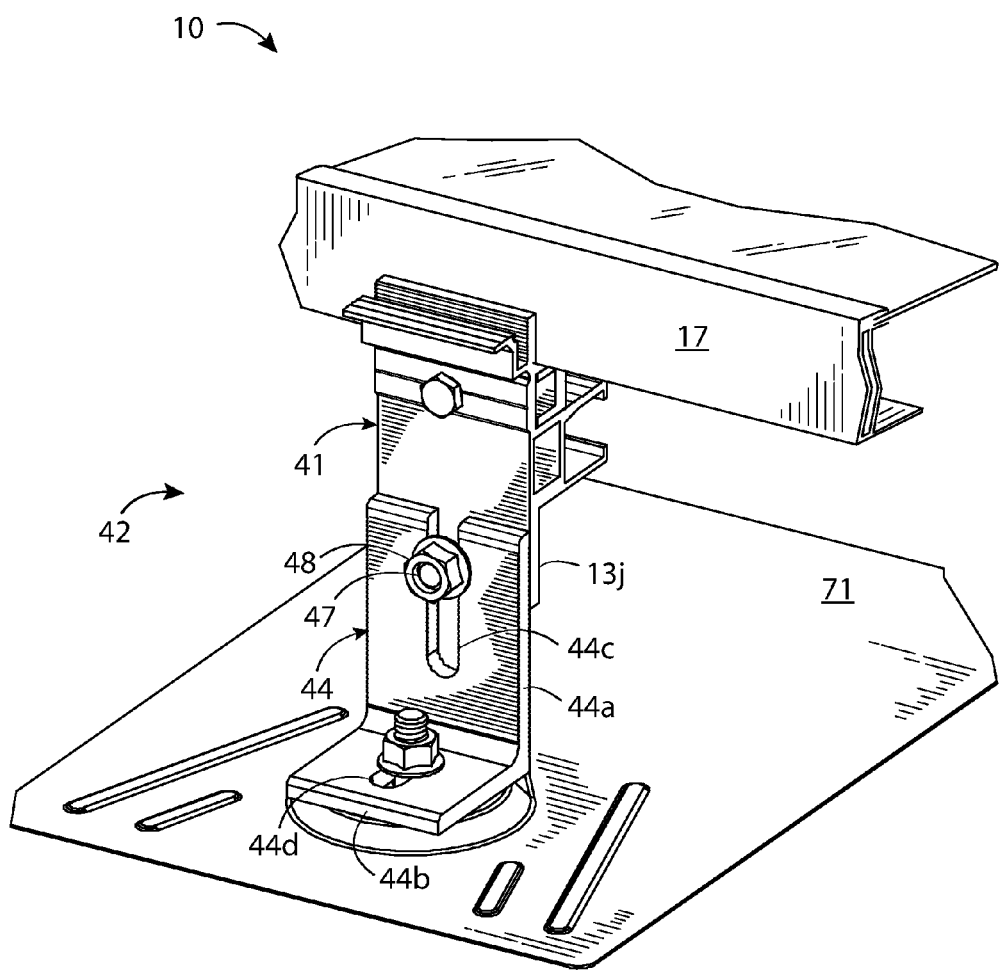
FIG. 26 illustrates an enlarged view of a portion of the solar panel mounting system taken along detail XXVI in FIG. 24 and showing the solar panel bottom clamp securing a solar panel to a rail-less solar panel mounting device.
Figure 27:
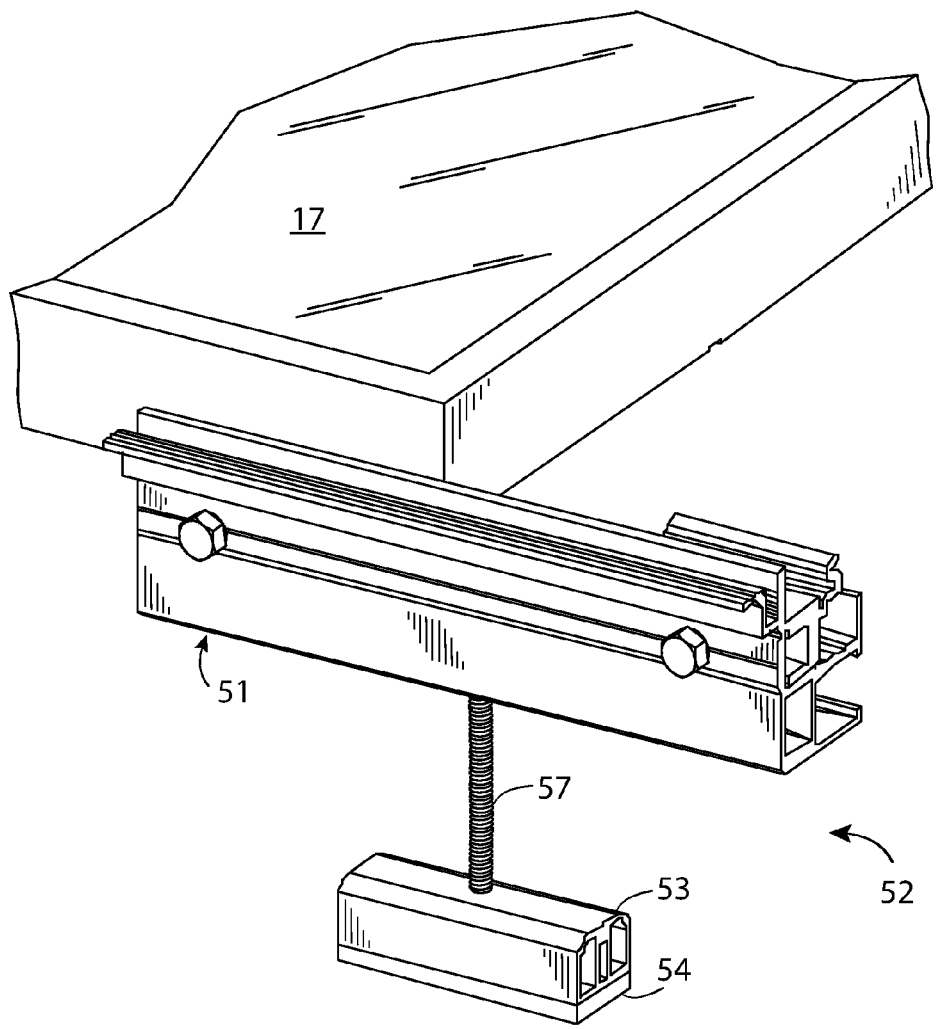
FIG. 27 illustrates an enlarged view of a portion of the solar panel mounting system taken along detail XXVII in FIG. 24 and showing the solar panel bottom clamp securing a solar panel to solar panel rail-less splice.
Figure 28:
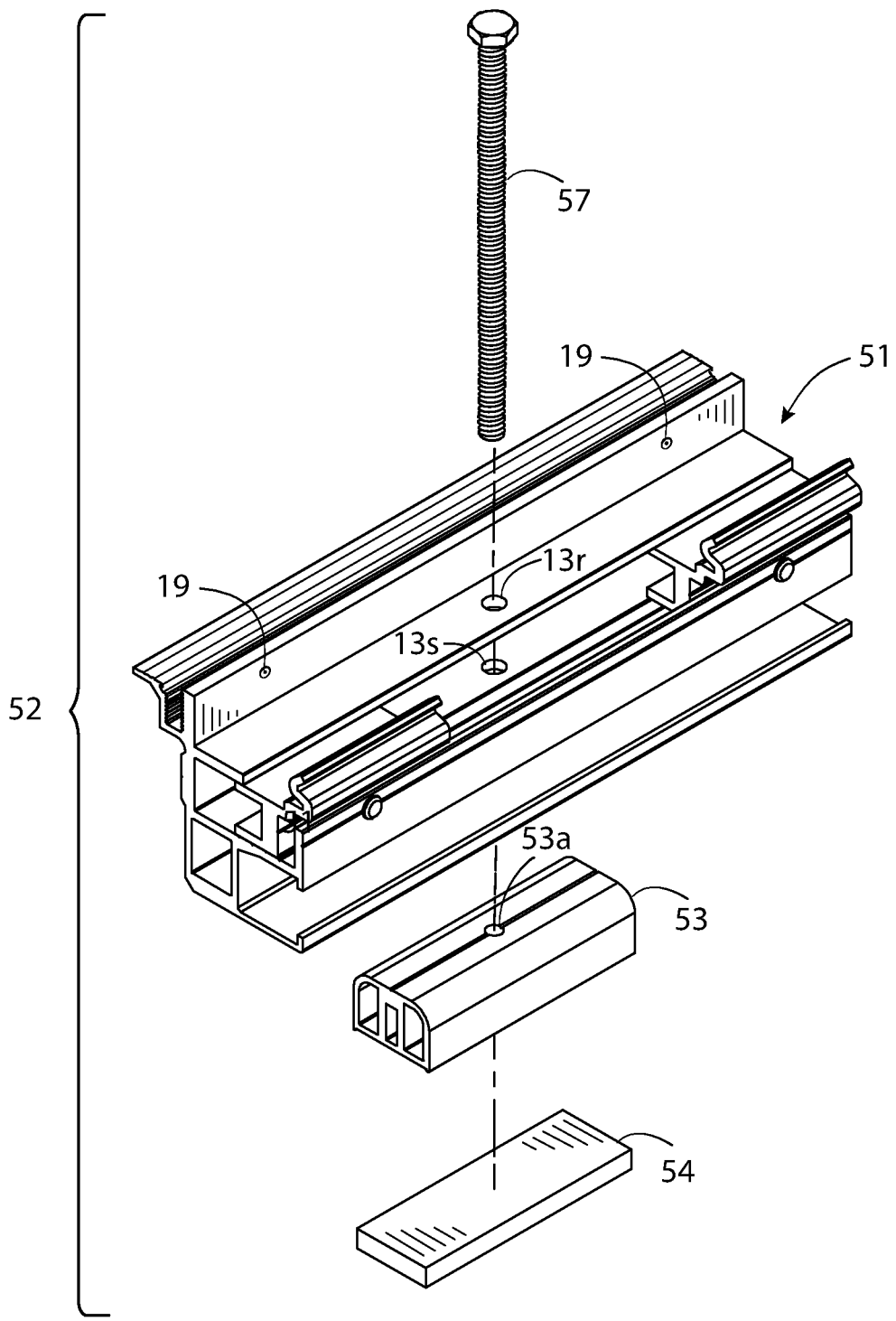
FIG. 28 illustrates an exploded top perspective view of the rail-less solar panel rail-less splice of FIG. 24 utilizing the solar panel bottom clamp of FIGS. 13-15.

FIG. 24 illustrates a top perspective view of the solar panel mounting system 10 utilizing the solar panel bottom clamp assemblies 41, 51 rail-less solar panel mounting device 42 and a rail-less splice 52, respectively. FIG. 25 illustrates a side elevation view of the solar panel mounting system 10 of FIG. 24 showing the solar panels 17, the mid-clamp 18, rail-less solar panel mounting device 42. FIG. 26 illustrates an enlarged view of a portion of the solar panel mounting system taken 10 showing the solar panel bottom clamp assembly 41 securing a solar panel 17 to a rail-less solar panel mounting device 42. FIG. 27 illustrates an enlarged view of a portion of the solar panel mounting system 10 taken showing the solar panel bottom clamp assembly 51 securing the solar panel 17 to rail-less splice 52. FIG. 28 illustrates an exploded top perspective view of the rail-less splice 52.

Referring to FIGS. 24 and 25, the solar panel bottom clamp assembly 41 in combination with the rail-less solar panel mounting device 42 attaches to the solar panels 17 to the roof, along the outside perimeter of the solar panels 17. Between the solar panels 17, a mid-clamp 18 can secure the solar panels to a rail-less solar panel mounting device 43. In FIG. 24, the solar panel bottom clamp assembly 51 in combination with the rail-less splice 52 attaches to the solar panels 17 along their outside perimeter.

Referring to FIGS. 25 and 26, the rail-less solar panel mounting device 42 includes the L-foot bracket 44. Referring to FIG. 26, the L-foot bracket 44 includes a first L-portion 44a and a second L-portion 44b project directly from the first L-portion 44a. As illustrated the first L-portion 44a projects upward from the second L-portion 44b at approximately a right-angle although the second L-portion 44b can project upward at other angles. The first L-portion 44a includes a first slotted aperture 44c and the second L-portion 44b includes a second slotted aperture 44d. The extension 13j of the solar panel bottom clamp assembly 41 engages the first slotted aperture 44c via the threaded fastener 47 and the threaded retainer 48 allowing the solar panel 17 and solar panel bottom clamp assembly 41 to be height adjustable with respect to the roof. The L-foot bracket 44 can to the roof through flashing 71 (FIG. 26) or other water proofing structures.

Referring to FIGS. 27 and 28, the solar panel bottom clamp assembly 51 is attached to the splice base 53 via the threaded fastener 57 through apertures 13r, 13s, 53a (FIG. 28). The splice base 53 can attach to a cushioning member 54 by adhesive, tape, or other bonding agents. The cushioning member 54 is typically made of a waterproof and/or weather resistant material such as ethylene propylene diene monomer (EPDM), neophrene, acrylonitrile butadiene rubber (NBR), or natural rubber. FIG. 28 also shows the grounding pin 19, which is optional, and previously described. Note that the splice base 53, cushioning member 54, and the threaded fastener 57 are also shown in FIGS. 14 and 15 in side view.

This disclosure has described the solar panel bottom clamp assembly 11 and variations of the solar panel bottom clamp assembly 21, 31, 41, 51 implemented in solar panel mounting system 10 using rail-less solar panel mounting devices 22, 32, 42 and a rail-less splice 52. It is not the intent of this disclosure to limit the claimed invention to the examples, variations, and exemplary embodiments described in the specification. Those skilled in the art will recognize that variations will occur when embodying the claimed invention in specific implementations and environments. For example, from the examples given, one skilled in the art could utilize the core structural and functional features of the solar panel bottom clamp assembly 11 illustrated in FIGS. 1-3 and implement a rail-based solar panel bottom clamp. While FIGS. 18, 23, and 26 show the solar panel bottom clamp assembly 21, 31, 41 respectively, secured to the roof through the flashing, the solar panel bottom clamp assembly 11, 21, 31, 41, 51 are not limited to flashing-type roof mounting systems. The inventor envisions the solar panel bottom clamp assembly 11, 21, 31, 41, 51 utilized on metal roofs, tile roofs, and other roof types that may not require flashing.

While the solar panel bottom clamp assembly 11, 21, 31, 41, 51, as illustrated, can be manufactured by extrusion, the solar panel bottom clamp assembly 11, 21, 31, 41, 51 are not limited to being manufactured by extrusion. Depending on the material, solar panel bottom clamp assembly 11, 21, 31, 41, 51 can be cast, molded, or otherwise formed using standard manufacturing techniques known to a person skilled in the art. Similarly, while the solar panel bottom clamp assembly 11, 21, 31, 41, 51 can be made of aluminum or other electrically conductive materials, there may be some environments where the solar panel bottom clamp assembly 11, 21, 31, 41, 51 can be made from fiberglass, carbon fiber, thermoplastic, or other materials suitable to withstand the wind force, rain, snow, temperature variation, or other factors encountered within a particular installation environment.

It is possible to implement certain features described in separate embodiments in combination within a single embodiment. Similarly, it is possible to implement certain features described in single embodiments either separately or in combination in multiple embodiments. The inventor envisions that these variations fall within the scope of the claimed invention.

While the examples, exemplary embodiments, and variations are helpful to those skilled in the art in understanding the claimed invention, it should be understood that, the scope of the claimed invention is defined solely by the following claims and their equivalents.

What is claimed is:

1. A device for mounting a solar panel to a roof, the solar panel including a return flange, comprising:
   a solar panel bottom clamp assembly including a base, a clamping member, a threaded fastener;
   the base includes a platform for seating the solar panel;
   the clamping member includes a clamping member body and a mounting clip;
   the mounting clip includes a hooked portion positioned above the clamping member body with an indentation sized and positioned to engage the return flange of the solar panel; and
   the threaded fastener non-threadably engages opposing sides of the base and threadably engages the clamping member causing the clamping member to move between the opposing sides of the base below the platform.

2. The device of claim 1, further including:
   a panel rest projecting upward from the platform and disposed to engage the solar panel.

3. The device of claim 1, wherein:
   the platform includes a top surface; and
   the indentation and the top surface are co-planar.

4. The device of claim 1, wherein:
   a first side of the opposing sides;
   the clamping member further includes a first projected portion and a second projected portion each projecting from the clamping member body toward the first side; and
   the threaded fastener threadably engages the clamping member body between the first projected portion and the second projected portion.

5. The device of claim 4, wherein:
   the platform includes an inside surface; and
   the second projected portion is movable against the inside surface.

6. The device of claim 5, further including:
   a spring surrounding the threaded fastener and positioned between the first side and the clamping member body between the first projected portion and the second projected portion.

7. The device of claim 1, further including:
   a first side of the opposing sides;
   a spring surrounding the threaded fastener and positioned between the first side and the clamping member body.

8. A device for mounting a solar panel to a roof, the solar panel including a return flange, comprising:

a solar panel bottom clamp assembly including, a base, a clamping member, and a threaded fastener;

the clamping member includes a clamping member body and a mounting clip, the mounting clip includes a hooked portion and an indentation formed between the hooked portion and the clamping member body, the indentation positioned to engage the return flange;

the base includes a first platform, a second platform, a first side, and a second side, the first platform seats the clamping member body between the first side and the second side, and the second platform disposed to seat the solar panel;

the first side and the second side project upward from opposing ends the first platform, the second platform projects away from the first side toward the second side; and the threaded fastener non-threadably engages the first side and the second side and threadably engaging the clamping member body making the clamping member body threadably movable between the first side and the second side.

9. The device of claim 8, further including a panel rest projecting upward from the second platform and disposed to engage the solar panel.

10. The device of claim 8, wherein:

the second platform includes a top surface; and the indentation and the top surface are co-planar.

11. The device of claim 8, wherein the second platform is parallel to the first platform.

12. The device of claim 8, wherein:

the clamping member further includes a first projected portion and a second projected portion each projecting from the clamping member body toward the first side; and the threaded fastener threadably engages the clamping member body between the first projected portion and the second projected portion.

13. The device of claim 12, wherein:

the first projected portion seats against the first platform;

the second platform includes an inside surface facing the first platform; and the second projected portion is movable against the inside surface of the second platform.

14. The device of claim 13, further including:

a spring surrounding the threaded fastener and positioned between the first side and the clamping member body between the first projected portion and the second projected portion.

15. The device of claim 8, further including a spring surrounding the threaded fastener and positioned between the first side and the clamping member body.

* * * * *